United States Patent [19]
Ugaki et al.

[11] Patent Number: 5,267,027
[45] Date of Patent: Nov. 30, 1993

[54] COMB FILTER-TYPE Y/C SEPARATOR CIRCUIT

[75] Inventors: Hidehiro Ugaki, Souraku; Kazunori Nohara, Osaka; Nobukazu Hosoya, Nara, all of Japan

[73] Assignee: Sanyo Electric Co., Ltd., Moriguchi, Japan

[21] Appl. No.: 875,793

[22] Filed: Apr. 28, 1992

[30] Foreign Application Priority Data

| Apr. 30, 1991 | [JP] | Japan | 3-098891 |
| Jun. 13, 1991 | [JP] | Japan | 3-141967 |
| Jun. 28, 1991 | [JP] | Japan | 3-158984 |
| Jul. 31, 1991 | [JP] | Japan | 3-192133 |

[51] Int. Cl.$^5$ .............................. H04N 9/64
[52] U.S. Cl. ..................... 358/31; 358/40; 333/215
[58] Field of Search ............ 358/31, 39, 40, 149; 333/215; 307/490, 494

[56] References Cited

U.S. PATENT DOCUMENTS

| 4,766,486 | 8/1988 | Ozaki | 358/31 |
| 4,809,060 | 2/1989 | Saeki | 358/31 |
| 4,969,033 | 11/1990 | Yamada et al. | 358/40 |
| 5,025,311 | 6/1991 | Hosoi | 358/31 |

Primary Examiner—James J. Groody
Assistant Examiner—John W. Miller
Attorney, Agent, or Firm—Armstrong, Westerman, Hattori, McLeland & Naughton

[57] ABSTRACT

A Y/C separation circuit includes a glass delay line for delaying an input composite video signal. A luminance signal and a chrominance signal are separated from each other by an adding circuit and a subtracting circuit each of which receives the input signal and an output signal from the glass delay line. The output signal from the glass delay line is phase-shifted by a 90° phase shifting circuit and then inputted to a multiplier which further receives the input signal. The multiplier outputs an error signal according to a phase difference between color burst signals included in the both signals, and a control voltage according to the error signal is outputted from a low-pass filter. The control voltage is applied to gyrators which terminate an input and an output of the glass delay line, respectively, whereby an inductance value of each of the gyrators is controlled by the control voltage such that a delay time of the glass delay line can be exactly adjusted at one horizontal period.

29 Claims, 22 Drawing Sheets (A)

(B)

(C)

(D)

F I G. 4
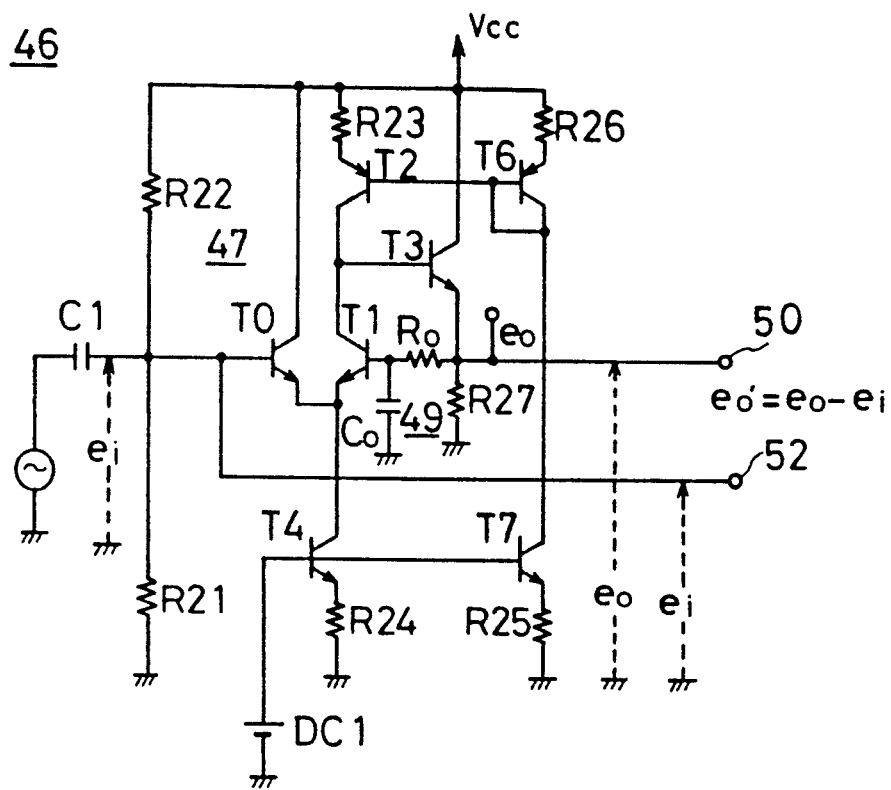

F I G. 7
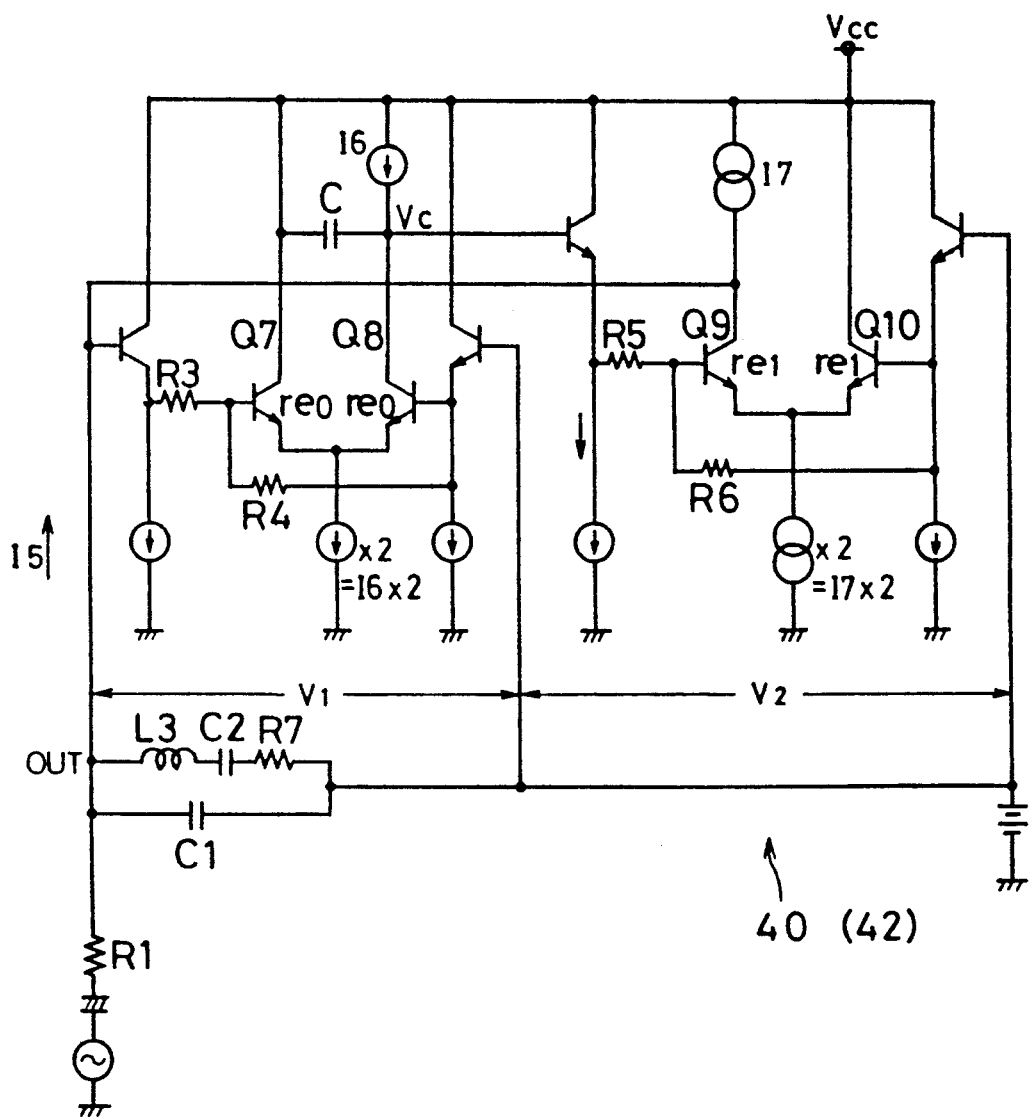

F I G. 11
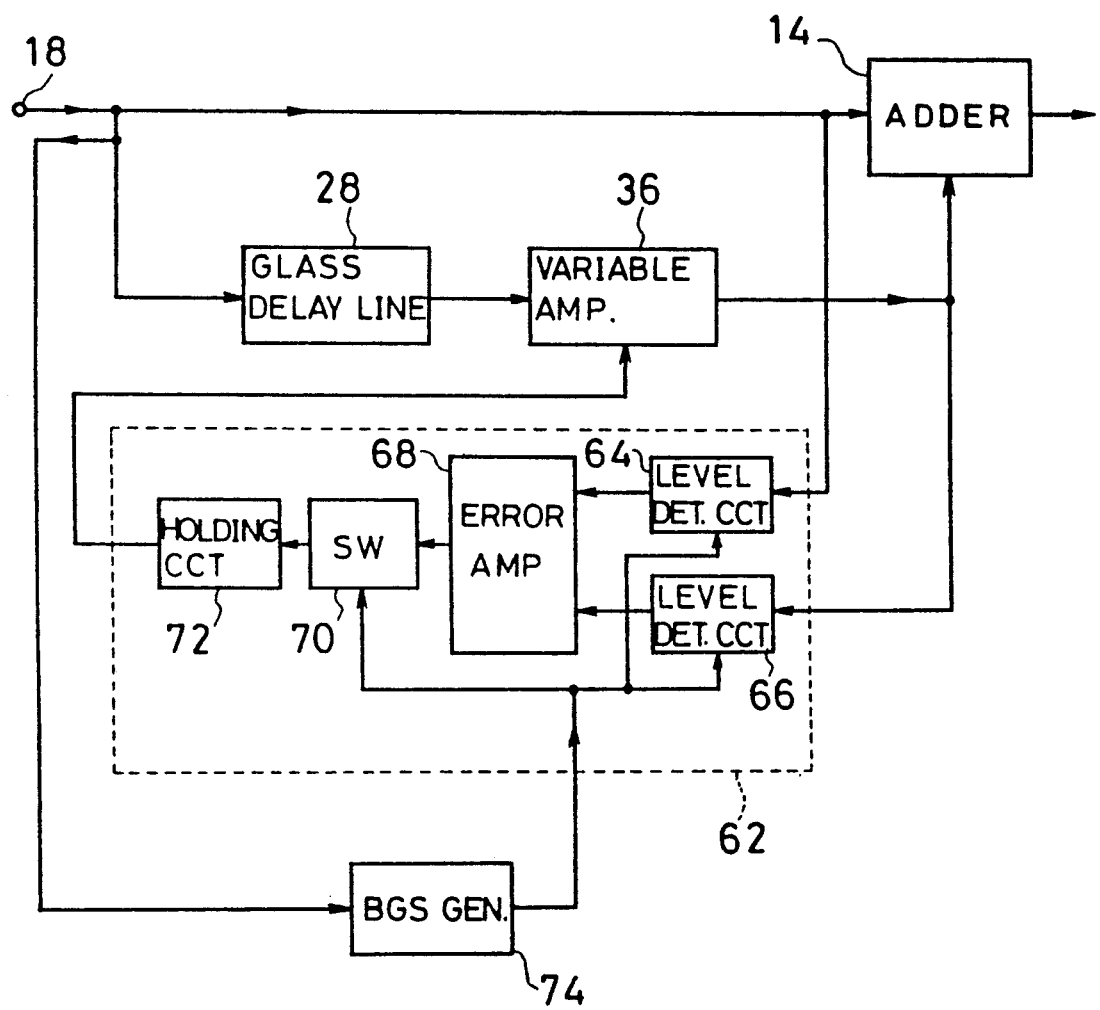

F I G. 12
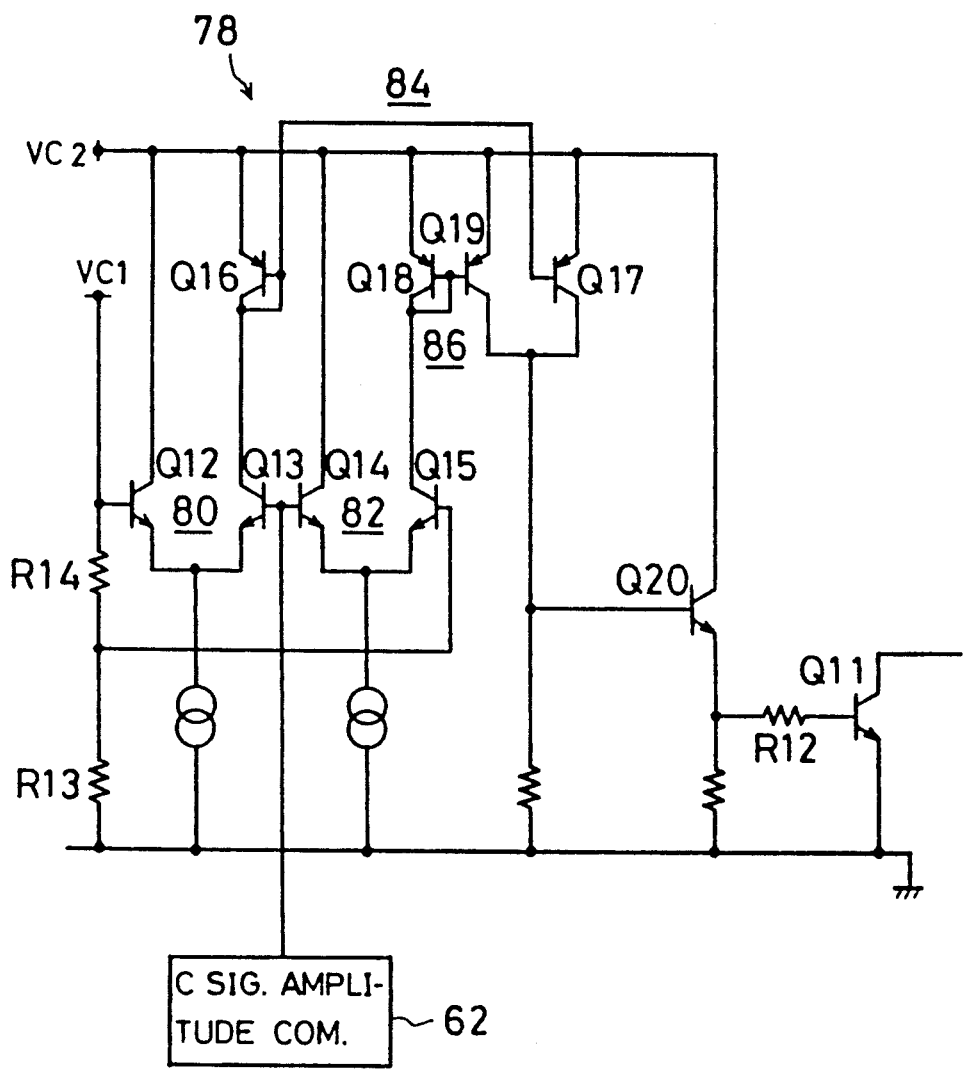

F I G. 15
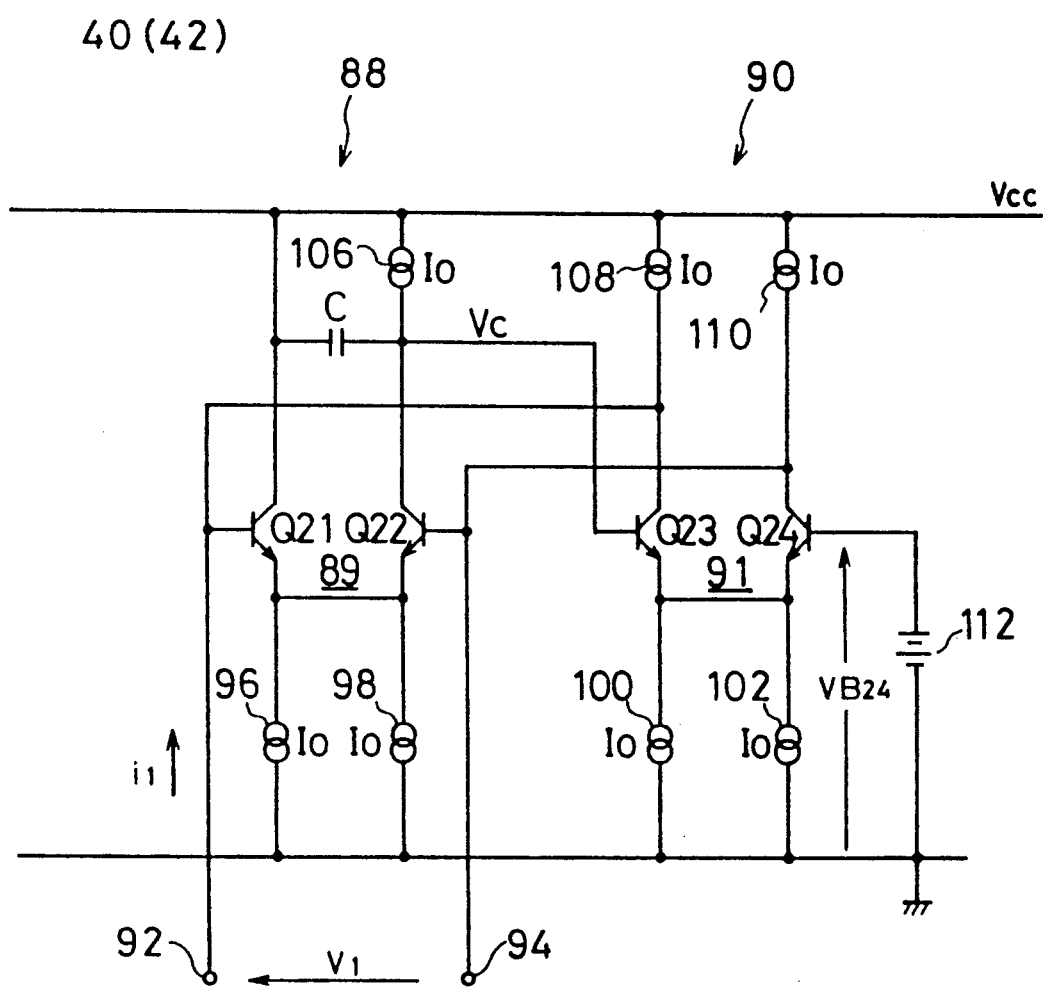

F I G. 21
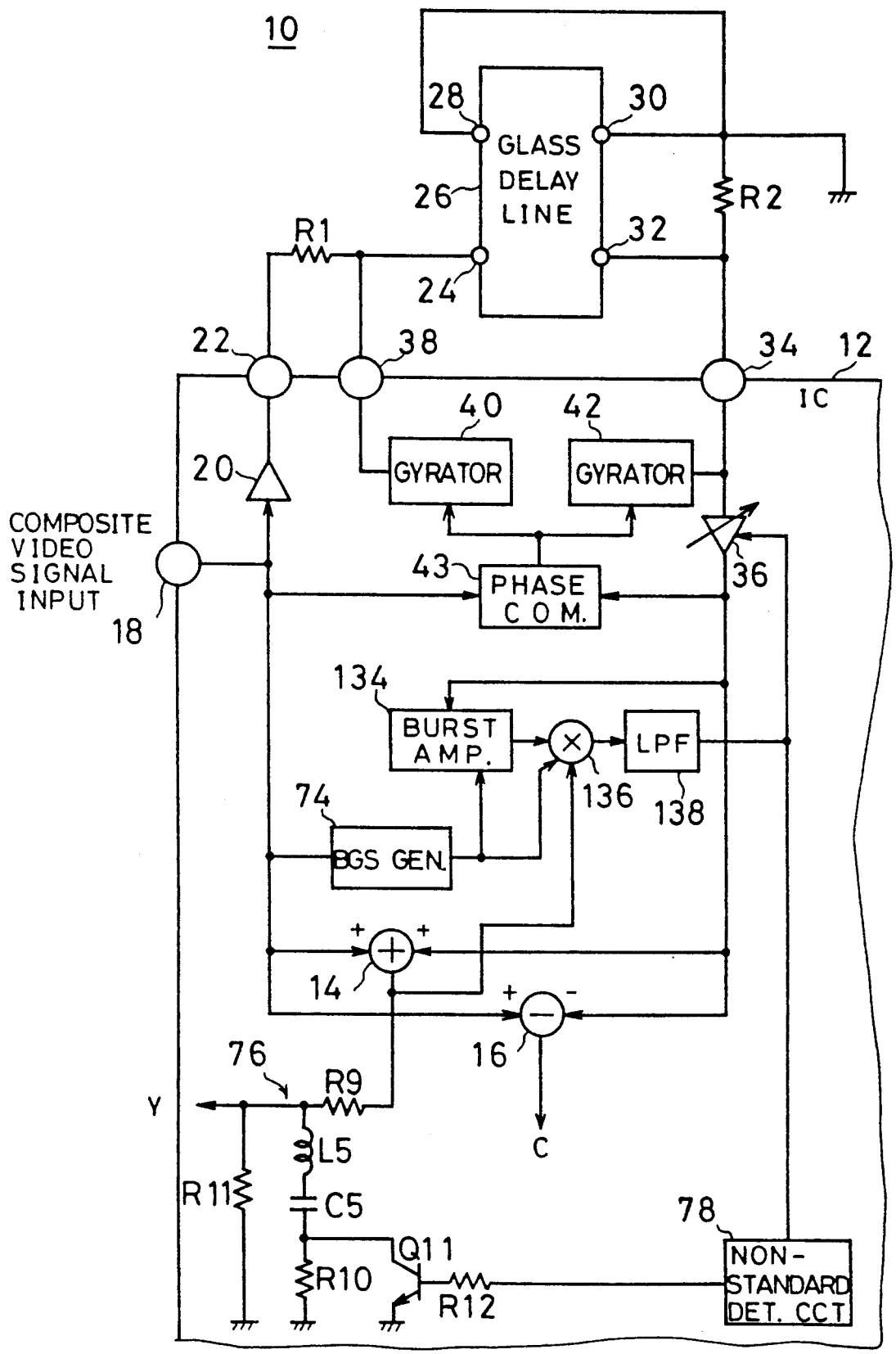

COMB FILTER-TYPE Y/C SEPARATOR CIRCUIT

BACKGROUND OF THE INVENTION

1. Field of the Invention

The present invention generally relates to a Y/C separation circuit. More specifically, the present invention relates to a comb filter type Y/C separation circuit in which a luminance signal and a chrominance signal are separated from each other on the basis of an input composite video signal and a signal outputted from a glass delay line having a delay time of one horizontal scanning line (1H).

2. Description of the Related Art

FIG. 1 shows one example of such a kind of comb filter type Y/C separate circuit 1. The Y/C separation circuit 1 separates a luminance signal and a chrominance signal from each other by utilizing a fact that a phase of the chrominance signal is inverted every other line. To this end, a delay time of a glass delay line 2 must be exactly 1H. However, the glass delay line 2 generally has a structure in which a pair of supersonic transducers are provided at diagonal corners of a rectangular glass substrate and an electrical signal inputted to one supersonic transducer and transduced into a supersonic signal which is propagated on a surface of the glass substrate to the other supersonic transducer, and an electrical signal being delayed by 1H is withdrawn from the other supersonic transducer. Therefore, due to a working condition of the surface of the glass substrate, dispersion occurs in a delay time. Therefore, as shown in FIG. 1, the glass delay line 2 is terminated by a variable inductance coil L and, by adjusting an inductance value of the variable inductance coil L, such dispersion of the delay time in the glass delay line 2 is corrected or compensated.

In addition, in order to place an amplitude of a composite video signal inputted from an input terminal 3 close to an amplitude of a video signal outputted from the glass delay line 2, by performing a gain adjustment of a variable amplifier 4, dispersion of an insertion loss is also corrected.

Furthermore, FIG. 2 shows a frequency-gain characteristic of a luminance signal at respective points a-d in FIG. 1. A composite video signal as shown in FIG. 2(A) is inputted at the point (a). As seen from FIG. 2(B), though a luminance signal having a frequency component in the vicinity of a color sub-carrier signal is outputted from the glass delay line 2 at the point (b) and thus a chrominance signal is attenuated by the glass delay line 2, as shown in FIG. (C), the luminance signal outputted at the point (c) from an adding circuit 5 includes a chrominance signal component. Therefore, in order to suppress a level of the chrominance signal component, a trap circuit 6 is provided at the output of the adding circuit 5 so as to reduce the chrominance signal component in the luminance signal so that deterioration of a video quality can be prevented. In addition, the chrominance signal is outputted from a subtracting circuit 7.

However, in the conventional Y/C separation circuit 1 shown in FIG. 1, since the variable inductance coil L and the variable amplifier 4 are respectively adjusted manually, not only it takes a long time for adjustment but also dispersion occurs in performance for each product.

SUMMARY OF THE INVENTION

A principal object of the present invention is to provide a novel Y/C separation circuit.

Another object of the present invention is to provide a Y/C separation circuit in which a delay time of a glass delay line can be easily and exactly compensated.

Another object of the present invention is to provide a Y/C separation circuit in which a delay time of a glass delay line can be easily and exactly compensated and deterioration of a video quantity can be prevented.

Another object of the present invention is to provide a Y/C separation circuit in which separation degree between a luminance signal and a chrominance signal can be improved.

Another object of the present invention is to provide a semiconductor inductance circuit which is suitable for a Y/C separation circuit utilizing a glass delay line.

A Y/C separation circuit according to the present invention comprises: an input terminal for receiving a composite video signal; a glass delay line having a delay time of one horizontal line for receiving a composite video signal inputted from the input terminal; an adding circuit for obtaining a luminance signal on the basis of the composite video signal and an output signal from the glass delay line; a subtracting circuit for obtaining a chrominance signal on the basis of the composite video signal and the output signal from the glass delay line; a semiconductor variable inductance circuit for terminating at least one of an input and an output of the glass delay line; and first control means for controlling an inductance value of the semiconductor variable inductance circuit on the basis of the input composite video signal and the output signal from the glass delay line.

In the above described Y/C separation circuit, the composite video signal (burst signal) inputted from the input terminal and the output signal (burst signal) outputted from the glass delay line are inputted to the first control means. The first control means detects a deviation amount of a phase difference between the both signals deviated from a reference condition that a phase difference between the both signals is exactly 180°, and applies a control signal according to the deviation amount to the semiconductor variable inductance circuit. The inductance value is changed in the semiconductor variable inductance circuit according to the control signal, and therefore, a terminating inductance of the glass delay line can be automatically controlled so that a phase difference between the burst signal included in the composite video signal from the input terminal and the burst signal included in the output signal outputted from the glass delay line can be exactly adjusted or controlled at 180°.

In accordance with the present invention, since the terminating inductance value is automatically adjusted by the semiconductor variable inductance circuit and the first control means, it is possible to exactly compensate the delay time of the glass delay line without manual operation, and therefore, it is possible to reduce manufacturing costs, and no dispersion in performance occurs for each product.

In one aspect of the present invention, a Y/C separation circuit further comprises: a variable amplifier inserted between an output of the glass delay line and an input of the first control means; second control means for adjusting a gain of the variable amplifier on the basis of the composite video signal from the input terminal and the output signal from the glass delay line; a trap circuit connected to an output of the adding circuit for attenuating a chrominance signal component in the luminance signal; and changing means for changing an attenuation rate of the trap circuit according to an output signal from at least any one of the first and second control means.

In the above described Y/C separation circuit, the composite video signal inputted to the input terminal and the output signal from the glass delay line are inputted to the second control means which detects an amplitude difference between the both signals, and applies an output signal according to the amplitude difference to the variable amplifier. Therefore, a gain of the variable amplifier can be automatically adjusted by the output signal from the second control means so that amplitudes of the both signals become equal to each other.

Furthermore, an output signal from at least any one of the first and second control means is applied to a nonstandard detecting circuit, for example. If the nonstandard detecting circuit determines that the input composite video signal is a nonstandard signal having lower quality which includes much noise, an output signal from the nonstandard detecting circuit is applied to the trap circuit so that a resister of the trap circuit is short-circuited, for example. Then, the attenuation rate at a center frequency of the trap circuit becomes large and thus the chrominance signal component is reduced in the luminance signal.

According to the above described aspect, since the second control means automatically controls or adjusts a gain of the variable amplifier, the amplitude of the chrominance signal component in the output signal from the glass delay line can be exactly corrected or compensated. Therefore, with respect to a composite video signal including much noise, deterioration of a video quantity can be prevented by changing the attenuation rate of the trap circuit.

In another aspect of the invention, a Y/C separation circuit comprises a multiplier for multiplying a burst signal included in a the input composite video signal or an output of the variable amplifier by a burst signal included in an output of the adding circuit. According to this aspect, it is possible to provide an adjustment-free Y/C separation circuit. Furthermore, since there are no causes that a separation degree of the luminance signal between the chrominance signal is deteriorated, it is possible to improve such a separation degree.

A semiconductor inductance circuit which is suitable for the above described Y/C separation circuit comprises a first differential amplifying circuit having a first input and a second input; and a second differential amplifying circuit having a third input and a fourth input.

According to one embodiment of the semiconductor inductance circuit, the first input is connected to an input terminal and the second input is connected to an output terminal, and the third input and fourth input are respectively connected to outputs of the first differential amplifier, and a capacitor is connected between the third input and the fourth input. Therefore, an inductance characteristic can be obtained in a voltage-current characteristic between the input terminal and the output terminal.

In another embodiment of the semiconductor inductance circuit, the third input is connected to the output of the first differential amplifying circuit and the fourth input is connected to a direct current voltage source which is grounded in alternating current, and the semiconductor inductance circuit further comprises: a first feed-back path for connecting a first output of the second differential amplifying circuit to the second input; a second feed-back path for connecting any one of a second output of the second differential amplifying circuit and the direct current voltage source to the second input; and a capacitor inserted between the output of the first differential amplifying circuit and an alternating current ground. According to this embodiment, a direct current bias is applied to the first input of the first differential amplifying circuit from the input terminal. In such a case, if the first input is higher than a voltage of the second input, an output voltage of the first differential amplifying circuit, that is, a voltage of the third input of the second differential amplifying circuit increases. Then, if the third input voltage becomes higher than a voltage of the fourth input which is maintained at a constant voltage, a voltage of the second output of the second differential amplifying circuit increases and becomes stable at a level that is equal to the first input voltage. On the other hand, the third input voltage becomes stable at a level that is equal to the fourth input level. Therefore, all voltages of the first input through the fourth input can be determined. Therefore, an operation of the variable inductance circuit becomes stable.

Furthermore, in the above described Y/C separation circuit, it is possible to utilize 90° phase shifting circuit having structure in which a low-pass filter including a resister and a capacitor is provided within a negative feed-back loop of a negative feed-back amplifying circuit, and a difference signal between an input signal of the negative feed-back amplifying circuit or a signal being equivalent to the input signal and an output signal of the negative feed-back amplifying circuit is withdrawn as an output. According to this embodiment, it is possible to perform 90° phase shifting without dependency on elements constituting the shifting circuit.

The above described objects and other objects, features, aspects and advantages of the present invention will become more apparent from the following detailed description of the present invention when taken in conjunction with the accompanying drawings.

BRIEF DESCRIPTION OF THE DRAWINGS

FIG. 4 is a circuit diagram showing one example of a 90° phase shifting circuit utilized in FIG. 3 embodiment;

FIG. 7 is a circuit diagram showing one example of a gyrator utilized in FIG. 3 embodiment;

FIG. 11 is a block diagram showing one example of a chrominance signal amplitude comparator utilized in FIG. 9 embodiment;

FIG. 12 is a circuit diagram showing one example of a nonstandard detecting circuit utilized in FIG. 9 embodiment;

FIGS. 14–19 are circuit diagrams respectively showing different examples of a semiconductor inductance circuit which is utilized as the gyrator;

FIG. 21 is a circuit diagram showing a modified example of FIG. 20 embodiment.

DETAILED DESCRIPTION OF THE PREFERRED EMBODIMENTS

Figure 1:
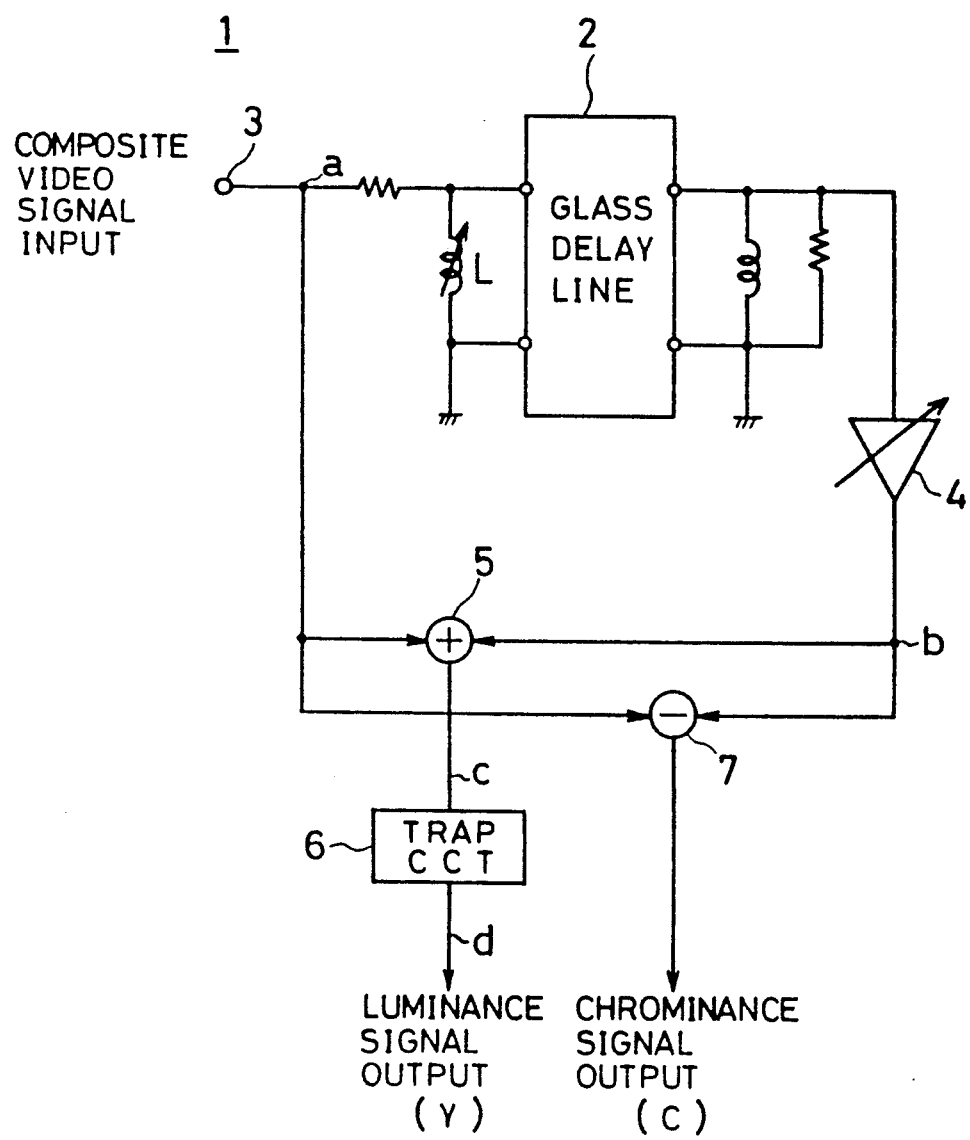
FIG. 1 is a circuit diagram showing a conventional Y/C separation circuit.
Figure 2:
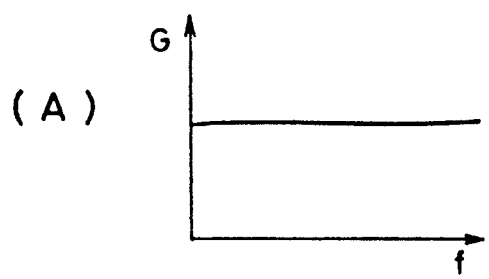
FIG. 2(A)–FIG. 2(D) are graphs showing gainfrequency characteristics at respective points in FIG. 1.
Figure 2:
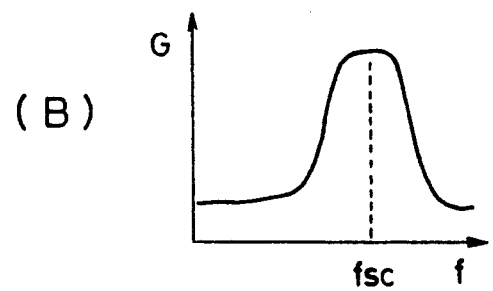
Figure 2:
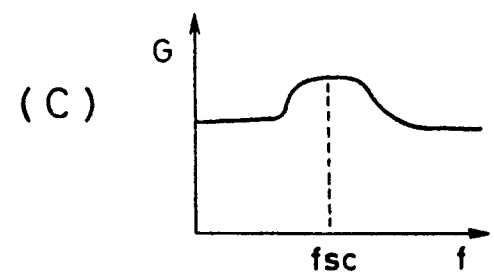
Figure 2:
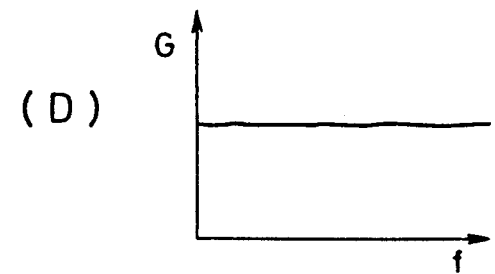
Figure 3:
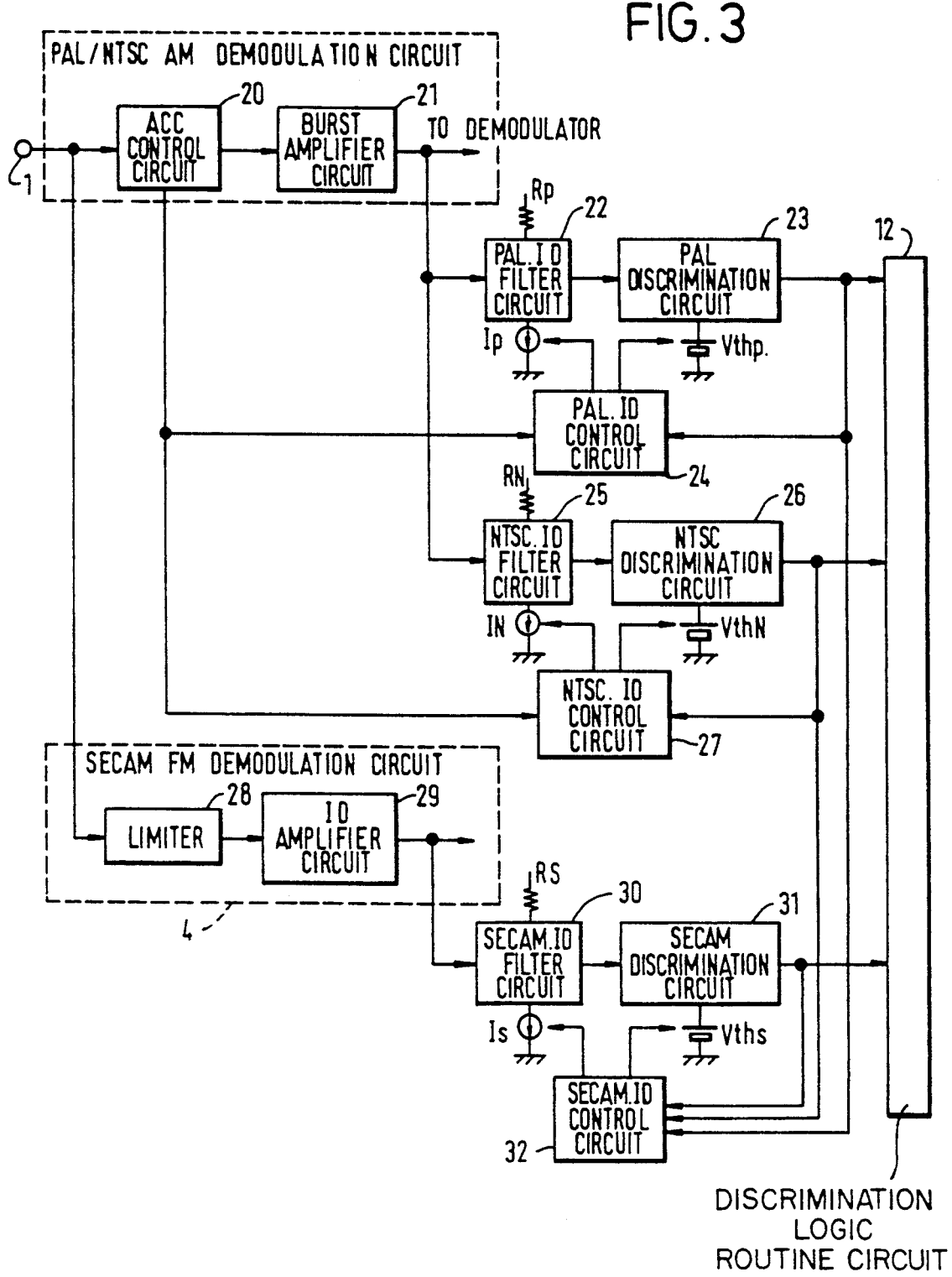
FIG. 3 is a circuit diagram showing one embodiment according to the present invention.

With reference to FIG. 3, a Y/C separation circuit 10 of this embodiment shown is incorporated in an integrated circuit (IC) 12, and the Y/C separation circuit 10 includes an adding circuit 14 and a subtracting circuit 16 which are both formed in the IC 12. The IC 12 has an IC terminal 18 which functions as an input terminal for receiving a composite video signal, and the composite video signal from the IC terminal 18 is inputted to the adding circuit 14 and the subtracting circuit 16, respectively. The composite video signal from the IC terminal 18 is also applied to an input terminal 24 of a glass delay line 26 via an amplifier 20, amplifier 20 is used for compensating an insertion loss in the glass delay line 26, and it may be omitted.

An input terminal 28 and an output terminal 30 of the glass delay line 26 are grounded, and a resistor R2 is inserted between output terminals 30 and 32 of the glass delay line 26. The glass delay line 26 is constructed in a manner described above and has a delay time of 1H. Therefore, the glass delay line 26 delays the input composite video signal and output a signal. This output signal is also inputted to the adding circuit 14 and the subtracting circuit 16 from an IC terminal 34 via a variable amplifier 36. The variable amplifier 36 is an amplifier for adjusting an amplitude of the output signal from the glass delay line. The adding circuit 14 performs an operation of "previous line + current line" so as to output a luminance signal, and the subtracting circuit 16 performs an operation of "previous line − current line" so as to output a chrominance signal.

Gyrators 40 and 42 each of which may be a semiconductor variable inductance circuit are connected to the input terminal 24 and the output terminal 32 of the glass delay line 26 via the IC terminals 38 and 34, respectively. The gyrators 40 and 42 functions as an input terminating inductance and an output terminating inductance of the glass delay line, respectively, and an inductance value of each of the gyrators 40 and 42 is controlled by an output signal of a low-pass filter 44. However, it is not necessary to terminate both the input and the output of the glass delay line 26, and at least one of them may be terminated by a single gyrator. Then, an error signal according to a phase difference between a burst signal included in the composite video signal from the IC terminal 18 and a burst signal included in the output signal from the glass delay line 26 is inputted to the low-pass filter 44.

In this embodiment shown, the output video signal from the glass delay line 26 is phase-advanced by a 90° phase shifting circuit 46. An output of the 90° phase shifting circuit 46 is, together with the composite video signal from the IC terminal 18 applied to a multiplier 48 which constitutes a phase comparator. Therefore, an error signal according to a deviation amount of a phase difference between the both signals with respect to a reference condition that a phase difference of the both signals is 90° is applied from the multiplier 48 to the low-pass filter 44. Therefore, the low-pass filter 44 outputs a control voltage according to the deviation amount of the phase difference, and the control voltage is applied to the gyrators 40 and 42 to adjust or control the inductance values thereof.

In addition, as the above described 90° phase shifting circuit 46, a circuit shown in FIG. 4 can be utilized, which disclosed in Japanese Patent Application No. 3-8585 filed by the same assignee of the present invention. In the 90° phase shifting circuit 46 shown in FIG. 4, an output eo' from a terminal 50 is given by the following equation (1).

$$eo' = eo - ei = ei(j\omega CoRo) \qquad (1)$$

where ei:an input voltage and eo:an output voltage.

Therefore, in spite of values of a resistor R0, a capacitor C0 and a signal angle frequency $\omega$, it is possible to obtain the output of eo' which is phaseshifted by 90°.

More specifically, in the 90° phase shifting circuit 46, a negative feed-back amplifying circuit 47 includes a differential pair mainly constituted by transistors T0 and T1. A transistor T4 constitutes a constant current source which becomes a load of a transistor T2 which withdraws an output of the differential pair in a form of a current. The output current withdrawn by the transistor T2 is outputted as a voltage from an emitter follower constituted by a transistor T3. In addition, transistors T6 and T7 are utilized for flowing a constant current in the transistor T2.

An output voltage withdrawn from the emitter follower of the transistor T3, that is, a terminal voltage of a resistor R27 is supplied to a low-pass filter 49 which includes a resistor Ro and a capacitor Co. An output of the low-pass filter 49, that is, a terminal voltage of the capacitor Co is supplied to a base of the transistor T1. On the other hand, an input signal to be phase-shifted is supplied to a base of the transistor T0.

Then, as an output of the 90° phase shifting circuit 46, difference between the output eo and the input ei of the feed-back amplifying circuit 47 is utilized. Actually, a voltage between terminals 50 and 52 is utilized.

In the above described circuit structure, on the assumption that an open loop gain of the negative feedback amplifying circuit 47 is A, a relationship between the input signal ei and the output signal eo is given by the following equation (2).

$$eo = \left( ei - eo \frac{(1/j\omega Co)}{Ro + (1/j\omega Co)} \right) \times A \qquad (2)$$

If the equation (2) is modified, the following equation (3) is obtainable.

$$eo = \frac{Aei}{\frac{A \times (1/j\omega Co)}{Ro + (1/j\omega Co)} + 1} \quad (3)$$

$$= \frac{Aei}{\frac{A}{j\omega CoRo + 1} + 1}$$

$$= \frac{Aei(j\omega CoRo + 1)}{A + j\omega CoRo + 1}$$

If it is assumed that A is sufficiently large, that is, $A >> j\omega CoRo+1$ the equation (3) becomes simple as shown by the following equation (4).

$$eo = ei(j\omega CoRo + 1) \quad (4)$$

If the input signal ei is subtracting from the output signal eo, the following equation (5) which is the same as the above described equation (1) is obtainable.

$$eo - ei = ei(j\omega CoRo) \quad (5)$$

Thus, according to FIG. 4 circuit, in spite of values of the resistor Ro, capacitor Co and the frequency, the output being phase-shifted by 90° is obtainable. If FIG. 4 circuit is utilized, it is suitable for an integrated circuit because there is no reason that a capacitance of the capacitor Co must be larger.

Figure 5:
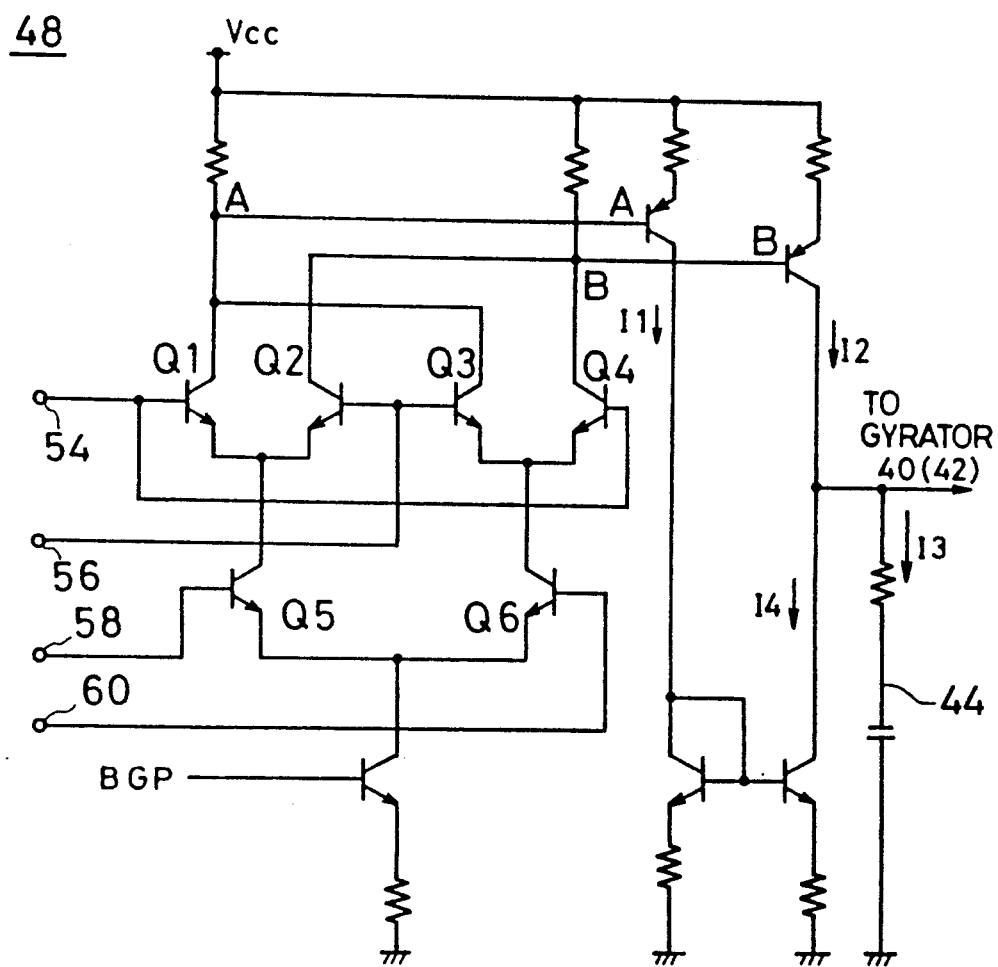
FIG. 5 is a circuit diagram showing one example of a multiplier utilized in FIG. 3 embodiment.
Figure 6:
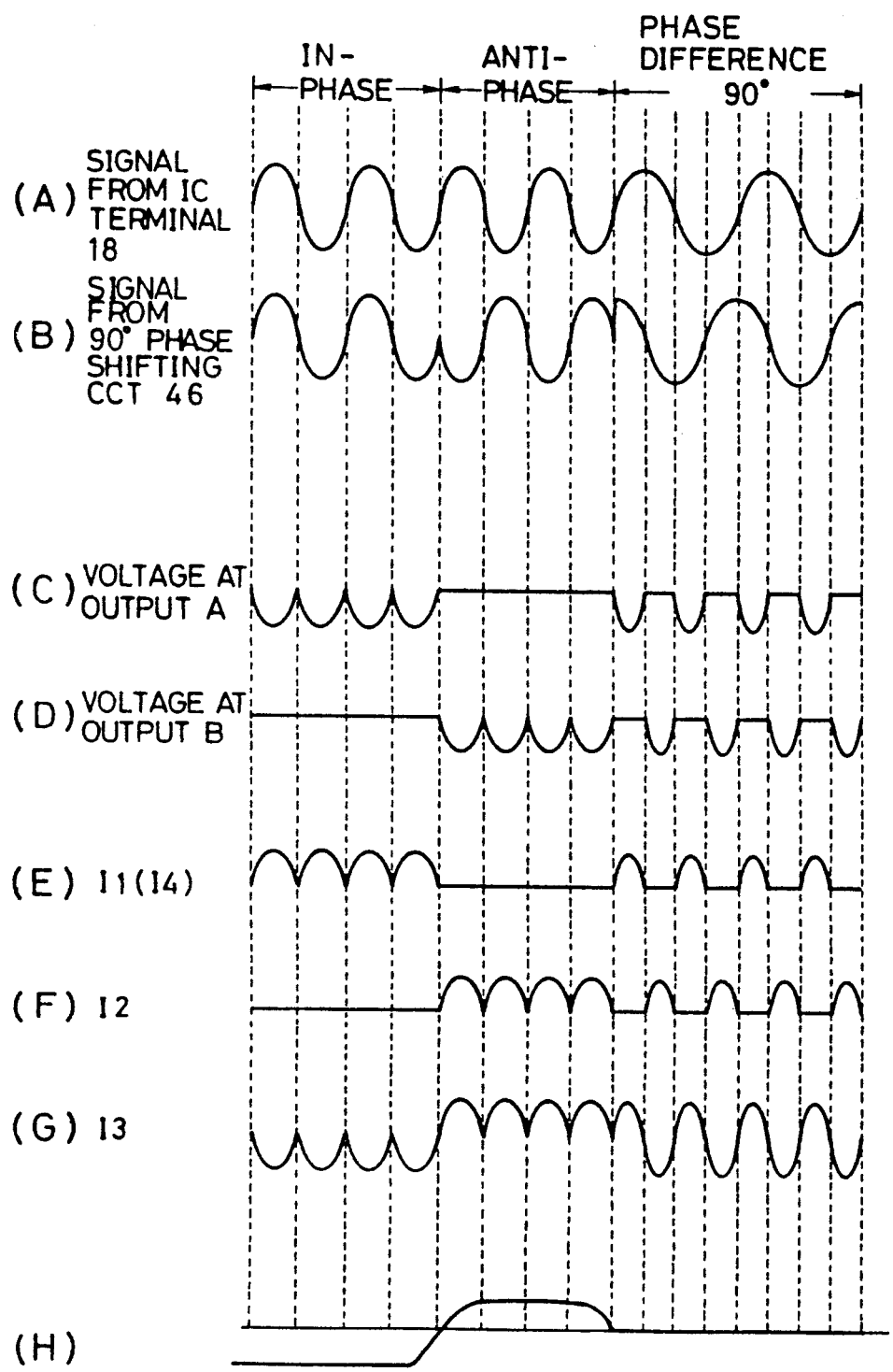
FIG. 6(A)–FIG. 6(H) are waveform charts showing an operation of the multiplier shown in FIG. 5.

In addition, the phase comparator, that is, the multiplier 48 is constructed as shown in FIG. 5 and operates as shown in FIG. 6. More specifically, a signal shown in FIG. 6(A) is inputted to an input terminals 54 and 56 from the IC terminal 18, and a signal as shown in FIG. 6(B) is inputted to input terminals 58 and 60 from the 90° phase shifting circuit 46.

If the above described both signals are in-phase, in a positive period, transistors Q1 and Q5 are turned-on and, in a negative period, transistors Q3 and Q6 are turned-on. Therefore, a voltage at an output A pulsates toward a negative direction for each half period as shown in FIG. 6(C), and a voltage at an output B becomes a constant voltage as shown in FIG. 6(D). Therefore, a current I1 flowing a transistor A, that is, current I4 pulsates toward a positive direction as shown in FIG. 6(E), and a current I2 flowing a transistor B becomes a constant current as shown in FIG. 6(F). Therefore, a current I3 flowing the low-pass filter 44, which is "I2-I4" pulsates toward a negative direction as shown in FIG. 6(G). The current I3 is smoothed or integrated by the low-pass filter 44, and therefore, the low-pass filter 44 outputs a negative control voltage as shown in FIG. 6(H) when both signals are in-phase.

In a case both signals are in out-of-phase, in a positive period of a signal from the IC terminal 18, the transistors Q4 and Q6 are turned-on and, in a negative period of the signal from the IC terminal 18, the transistors Q2 and Q5 are turned-on. Therefore, a voltage at the output A becomes constant as shown in FIG. 6(C), and a voltage at the output B pulsates toward a negative direction for each half period as shown in FIG. 6(D). Therefore, the current I1 flowing the transistor A, that is, the current I4 becomes a constant current as shown in FIG. 6(E), and the current I2 flowing the transistor B pulsates toward a positive direction as shown in FIG. 6(F). Therefore, the current I3 flowing the low-pass filter 44, which is "I2-I4" pulsates toward a positive direction as shown in FIG. 6(G). The current I3 is smoothed and integrated by the low-pass filter 44, and therefore, the low-pass filter 44 outputs a positive control voltage as shown in FIG. 6(H) when the both signals are out-of-phase.

In case both signals have a phase difference of 90°, in a first half of a first half period of a signal from the IC terminal 18 as shown in FIG. 6(A), the transistors Q1 and Q5 are turned-on and, in a second half of the first half period of the signal, the transistors Q4 and Q6 are turned-on. In a first half of a second half period of the signal from the IC terminal 18, the transistors Q3 and Q6 are turned-on and, in a second half of the second half period, the transistors Q2 and Q5 are turned-on. Therefore, a voltage at the output A becomes a negative voltage in only the first halves of the respective half periods as shown in FIG. 6(C), and a voltage at the output B represents a negative voltage in only the second halves of the respective half periods as shown in FIG. 6(D). Therefore, the current I1 flowing the transistor A, that is, the current I4 flows in positive polarity in only the first halves of the respective half periods as shown in FIG. 6(E), and the current I2 flowing the transistor B flows in a positive direction in only the second halves of the respective half periods as shown in FIG. 6(F). Therefore, the current I3 flowing the low-pass filter 44, which is "I2-I4" approximately becomes a sine-wave as shown in FIG. 6(F). Therefore, the low-pass filter 44 outputs a control voltage of approximately 0 as shown in FIG. 6(H) when the both signals have a phase difference of 90°.

Thus, if the phase difference between the two signals inputted to the phase comparator, that is, the multiplier 48 is 90°, the control voltage or approximately 0 is outputted from the low-pass filter 44 and, in a case where the phase difference between the two signals is deviated from 90°, a positive or negative control voltage according to a deviation amount is outputted from the low-pass filter 44. The inductance values of the gyrators 40 and 42 are adjusted in response to the above described control voltage from the low-pass filter 44.

One example of the gyrator 40 or 42 which can be utilized in FIG. 3 embodiment is shown in FIG. 7. In FIG. 7, a signal Vc which is generated between a capacitor C and an alternative current ground is represented by the following equation (6).

$$Vc = \frac{1}{j\omega C} \cdot \frac{R4}{R3 + R4} V1 \cdot \frac{1}{2re0} \quad (6)$$

In addition, a voltage V2 which is generated between bases of transistors Q9 and Q10 which constitute a second differential pair is represented by the following equation (7).

$$V2 = Vc \cdot \frac{R6}{R5 + R6} \quad (7)$$

$$= \frac{1}{j\omega C} \cdot \frac{R4}{R3 + R4} V1 \cdot \frac{1}{2re0} \cdot \frac{R6}{R5 + R6}$$

$$I5 = \frac{V2}{2re1}$$

$$I5 = \frac{1}{j\omega C} \cdot \frac{R4}{R3 + R4} V1 \cdot \frac{1}{2re0} \cdot \frac{R6}{R5 + R6} \cdot \frac{1}{2re1}$$

$$\frac{I5}{V1} = \frac{1}{j\omega C} \cdot \frac{R4}{R3 + R4} \cdot \frac{1}{2re0} \cdot \frac{R6}{R5 + R6} \cdot \frac{1}{2re1}$$

$$\frac{V1}{I5} = j\omega C \cdot \frac{R3 + R4}{R4} \cdot 2re0 \cdot \frac{R5 + R6}{R6} \cdot 2re1$$

Therefore, from the above described equation (7), by adjusting or controlling a differential resistor re0 of each of transistors Q7 and Q8 constituting a first differential pair or a differential resistor re1 of each of the transistors Q9 and Q10 by means of the control voltage from the low-pass filter 44, the inductance value of the gyrator 40 or 42 can be controlled. More specifically, if currents I6 and/or I7 of variable constant current sources shown in FIG. 7 are controlled by the control voltage from the low-pass filter 44, the differential resisters re0 and/or re1 are changed, an equivalent inductance value of the gyrator 40 or 42 can be changed.

Figure 8:
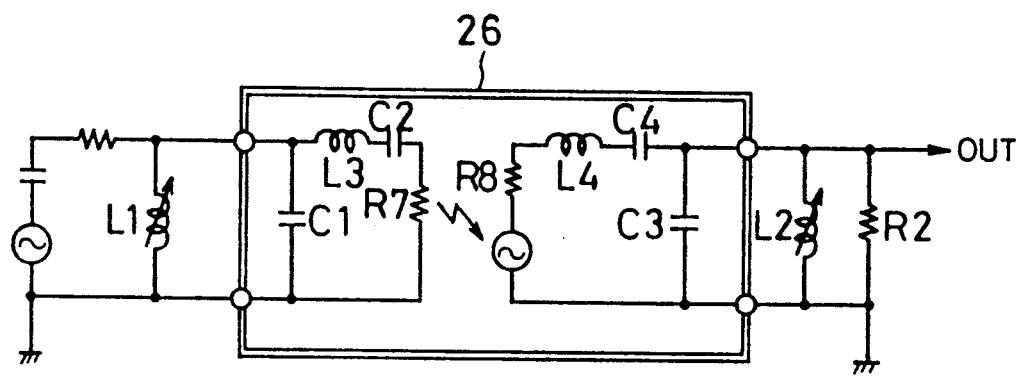
FIG. 8 is a circuit diagram showing a glass delay line utilized in FIG. 3 embodiment.

In addition, an equivalent circuit diagram of the glass delay line 26 is shown in FIG. 8, and the gyrators 40 and 42 are corresponding to terminating inductance L1 and L2 shown in FIG. 8, respectively. Therefore, if the inductance values of the gyrators 40 and 42, that is, the terminating inductance L1 and L2 are adjusted, a tuning frequency of a tuning circuit constituted by the inductance L3 and the capacitance C1 and C2 and a tuning frequency of a tuning circuit constituted by the inductance L4 and the capacitance C3 and C4 are changed, respectively, and a group delay characteristic at 3.58 MHz is also changed. Therefore, a delay time of a signal in the glass delay line 26 is changed. In addition, the resistors R1 and R2 are matching resistors for resistors R7 and R8, respectively.

Figure 9:
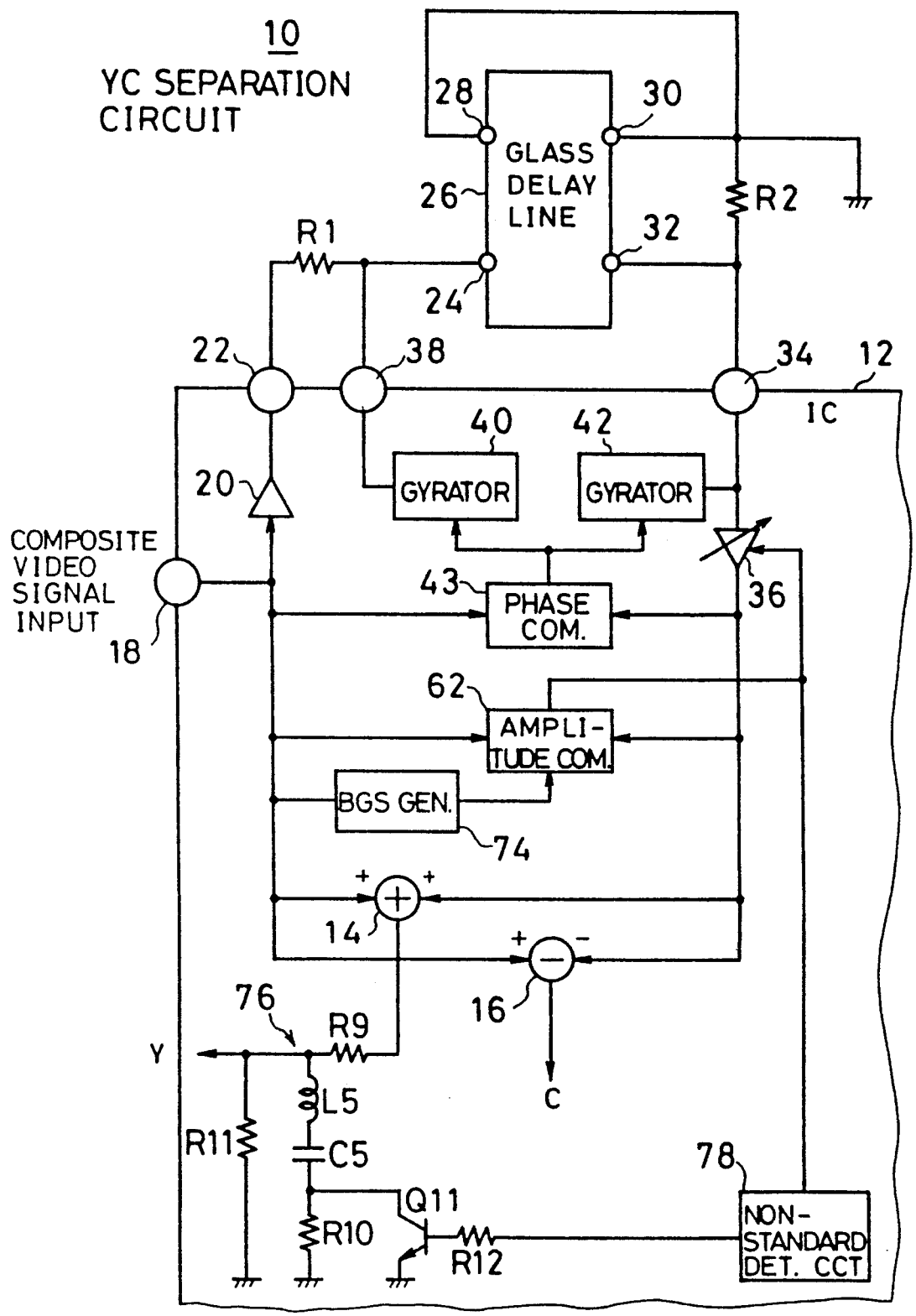
FIG. 9 is a circuit diagram showing another embodiment according to the present invention.

An embodiment of a Y/C separation circuit 10 shown in FIG. 9 is different from the embodiment shown in FIG. 3 in the following point. More specifically, the variable amplifier 36 shown in FIG. 9 is controlled by an output of a chrominance signal amplitude comparator 62 to which the input composite video signal and the output signal from the glass delay line 26 are inputted. The chrominance signal amplitude comparator 62 includes, as shown in FIG. 11, a level detector 64 which detects an amplitude of a burst signal included in the input composite video signal from the IC terminal 18 and a level detector 66 which detects an amplitude of a burst signal included in the output signal from the glass delay line 26. The amplitudes of the burst signals respectively detected by the level detectors 64 and 66 are outputted to an error amplifier 68 in which an amplitude difference between both the burst signals is detected and amplified, and then outputted to a holding circuit 72 via a switch 70. In addition, the level detectors 64 and 66 and the switch 70 is controlled by an output of a burst gate signal (BGS) generator 74 which generates a signal during a burst period so that the same can be operated in only the burst period. An output which makes the amplitude difference of the burst signals 0 is outputted from the holding circuit 74 and applied to the variable amplifier 36.

In addition, a trap circuit 76 is connected to an output of the adding circuit 14 via a resistor R9. The trap circuit 76 is constructed as an LCR series resonant circuit in which a inductance L5, capacitance C5 and resistor R10 are connected in series to each other or an LC series resonant circuit in which the resistor R10 is short-circuited by a transistor Q11. If the trap circuit 76 is the LCR series resonant circuit, the Y/C separation circuit 10 shown in FIG. 9 functions as a two-dimensional Y/C separation circuit and, if the trap circuit 76 is the LC series resonant circuit, the Y/C separation circuit 10 functions as one-dimensional Y/C separation circuit. Such a change of the trap circuit 76 is performed by an output of a nonstandard detecting circuit 76 which is connected to a base of the transistor Q11 via a resistor R12. In addition, a resistor R11 is grounded in parallel with the trap circuit 76.

A luminance signal from the adding circuit 14 is attenuated by the trap circuit 76 and thereafter outputted. There is an occasion that the input video signal inputted to the adding circuit 14 is a single having low quality. For example, a reproduced video signal from a VTR tape which is made by repeated dubbing, a TV signal of a weak electric field, and etc. In such a case, it is not preferable to construct the trap circuit 76 as the LCR series resonance circuit because such a video signal is not suitable for automatic adjustment of the phase difference and the amplitude difference, and therefore, the trap circuit 76 is used as the LC series resonant circuit in which the resistor R10 is short-circuited. In order to short-circuit the resistor R10, the transistor Q11 is turned-on by the output of the nonstandard detecting circuit 78.

The nonstandard detecting circuit 78 includes, as shown in FIG. 12, a differential pair 80 including transistors Q12 and Q13 and a differential pair 82 including transistors Q14 and Q15. An output from the chrominance signal amplitude comparator 62 (direct current level) is applied to bases of the transistors Q13 and Q14, respectively. A voltage from a direct current voltage source VC1 is applied to a base of the transistor Q12, and a voltage which is obtained by dividing the voltage of the direct current voltage source VC1 by means of resistors R13 and R14 is applied to the transistor Q15. A current mirror circuit 84 including transistors Q16 and Q17 is connected to a collector of the transistor Q13, and a current mirror circuit 86 including transistors Q18 and Q19 is connected to a collector of the transistor Q15. Furthermore, respective collectors of the transistors Q17 and Q19 are commonly connected to a base of a transistor Q20. An emitter of the transistor Q20 is connected to a base of the transistor Q11 via the resistor R12. In addition, collectors of the transistors Q12, Q14 and Q15 and emitters of the transistors Q16, Q17 and Q18 are commonly connected to a direct current voltage source VC2.

In operation, if an input of the chrominance signal amplitude comparator 62 has a value within a range defined by a base voltage of the transistor Q15 and a base voltage of the transistor Q12, the transistors Q12 and Q14 are turned-on, but the differential pairs 80 and 82 are not activated. Therefore, since no operation occurs in the current mirror circuits 84 and 86, the output of the nonstandard detecting circuit 78 is zero, and therefore, the transistor Q11 is not turned-on. In such a case, the trap circuit 76 is constructed as the LCR series resonant circuit and operates as it is.

In a case of a nonstandard signal that the input from the chrominance signal amplitude comparator 62 is smaller than the base voltage of the transistor Q15, since the transistor Q15 is turned-on, the transistor Q18 of the current mirror circuit 86 is turned-on. Therefore, the transistors Q19 and Q20 are turned-on, and thus, the transistor Q11 is turned-on by the output of the nonstandard detecting circuit 78.

Furthermore, in a case of a nonstandard signal that the input from the chrominance signal amplitude comparator 62 is larger than the base voltage of the transistor Q12, since the transistor Q13 is turned-on, the transistor Q16 of the current mirror circuit 84 is turned-on. Therefore, the transistors Q17 and Q20 are turned-on, and thus, the transistor Q11 is also turned-on by the output of the nonstandard detecting circuit 78.

That is, in both cases that the input from the chrominance signal amplitude comparator 62 is smaller than the base voltage of the transistor Q15 and that the input is larger than the base voltage of the transistor Q12, the nonstandard detecting circuit 78 determines that the input composite video signal is a nonstandard signal which is not suitable for automatic adjustment of the phase difference and the amplitude difference. Therefore, the nonstandard detecting circuit 78 construct the trap circuit 76 as the LC series resonant circuit so that the Y/C separation circuit 10 shown in FIG. 9 functions as a one-dimensional Y/C separation circuit. In such a case, an attenuation rate at a center frequency of the trap circuit 76, that is, a color sub-carrier frequency can be made larger, and therefore, a chrominance signal component included in a luminance signal can be eliminated. Thus, by changing the attenuation rate in the trap circuit 76 by means of the output of the non standard detecting circuit 78, the Y/C separation circuit 10 of this embodiment can be changed as a two-dimensional Y/C separation circuit or a one-dimensional Y/C separation circuit. Therefore, in either of a case where the input composite signal is a standard signal having a high quality or a case where the input composite video signal is a nonstandard signal having a low quality, it is possible to perform a most suitable Y/C separation, and therefore, the embodiment of FIG. 9 is conductive to an automatic adjustment of a Y/C separation circuit.

Figure 10:
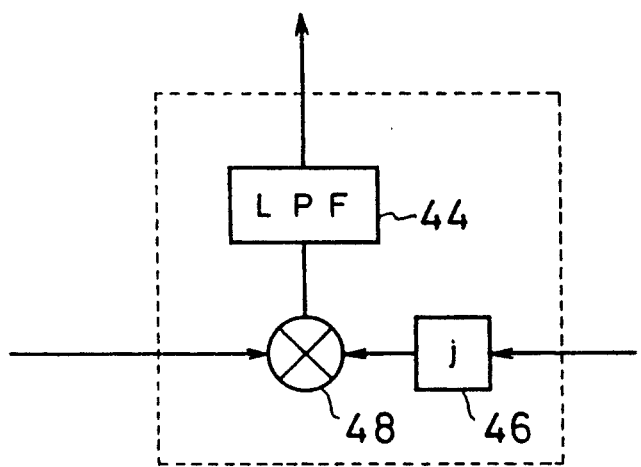
FIG. 10 is a circuit diagram showing one example of a burst phase comparator utilized in FIG. 9 embodiment.

In addition, in the embodiment of FIG. 9, a burst phase comparator 43 is constructed as shown in FIG. 10 wherein a low-pass filter 44, 90° phase shifting circuit 46 and multiplier 48 are included; however, such structure is similar to that the embodiment of FIG. 3, and therefore, a description of an operation of the burst phase comparator 43 is omitted here to avoid duplicate.

Furthermore, in the embodiment shown in FIG. 9, the output from the chrominance signal amplitude comparator 62 is applied to the nonstandard detecting circuit 78; however, the output of the burst phase comparator 43 may be utilized for detecting whether the input signal is a standard signal or a nonstandard signal.

In addition, in the above described embodiments shown in FIG. 3 and FIG. 9, the 90° phase shifting circuit 46 is used such that the multiplier 48 can detects whether the two input signals have a phase difference of 90°; however, such 90° phase shifting circuit 46 can be omitted. In this case, the multiplier 48 may detect whether the two input signals have a phase difference of 180°.

Furthermore, the gyrators 40 and 42 may be controlled not only the output of the burst phase comparator 43 but also the output of the chrominance signal amplitude comparator 62.

Figure 13:
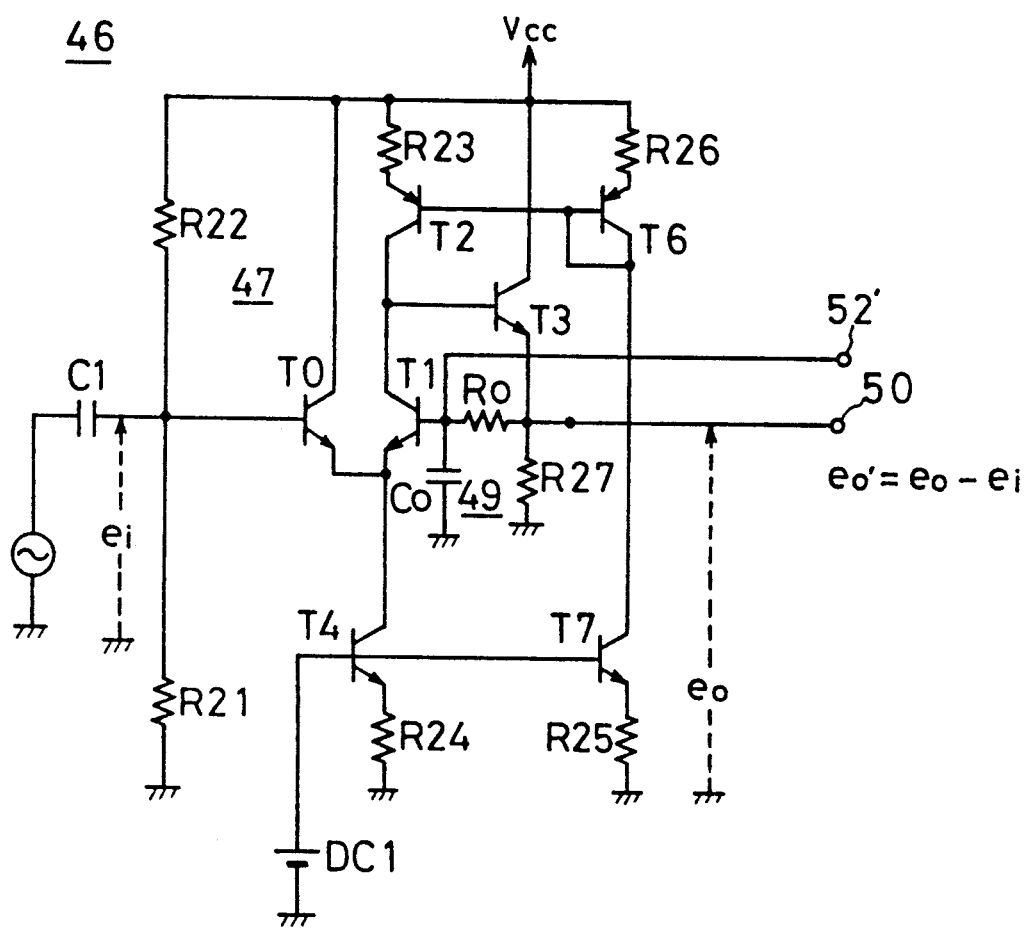
FIG. 13 is a circuit diagram showing a modified example of the 90° phase shifting circuit shown in FIG. 4.

In FIG. 13, a modified embodiment of the 90° phase shifting circuit 46 is shown. In this embodiment shown in FIG. 13, an output is obtained between a base of the transistor T1 and an emitter of the transistor T3. A reason why the output of the circuit 46 may be withdrawn from terminals 50 and 52' is that a differential amplifier operates such that two input voltages are made equal to each other, and therefore, the base voltages of the transistors T0 and T1 are equal to each other, and thus, both the base voltages are considered as an equivalent signal.

Figure 14:
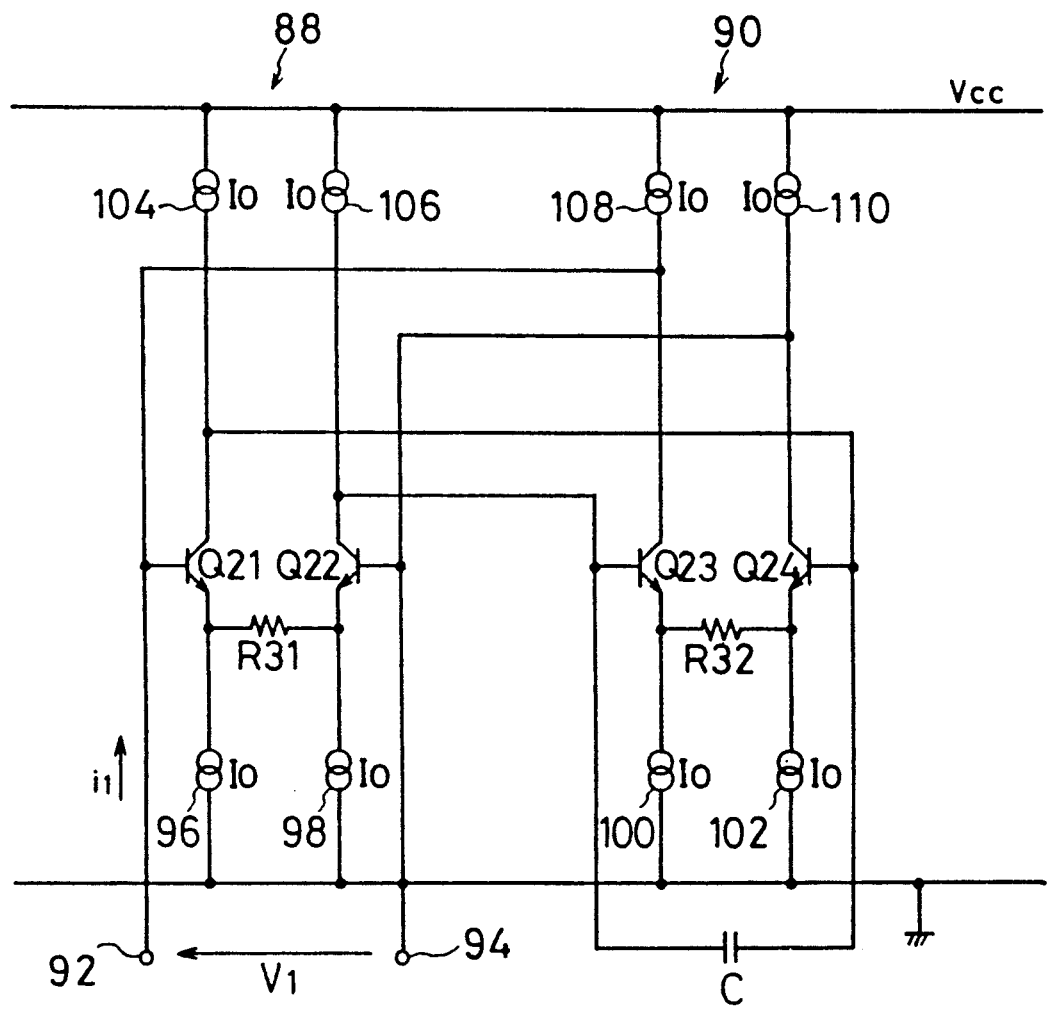

In FIG. 14, a semiconductor inductance circuit which can function as the above described gyrator 40 or 42. In the semiconductor inductance circuit, that is, the gyrator 40 or 42 shown in FIG. 14, collectors of transistors Q21 and Q22 which constitute a differential amplifying circuit 88 are connected to bases of transistor Q24 and Q23 which constitute a differential amplifying circuit 90, respectively. Bases of the transistor Q21 and Q22 are connected to collectors of the transistors Q23 and Q24, respectively. Furthermore, a capacitor C is connected between the base of the transistor Q23 and the base of the transistor Q24. Therefore, an inductance characteristic is obtainable in a voltage-current characteristic between an input terminal 92 and an output terminal 94. Therefore, the input composite video signal from the IC terminal 18 may be inputted to the input terminal 92, or the output signal from the glass delay line 26 may be inputted to the input terminal 92 through the IC terminal 34. In addition, reference numerals 96, 98, 100, 102, 104, 106, 108 and 110 denote constant current sources, respectively.

In the embodiment shown in FIG. 14, the base voltages of the transistors Q21 and Q22 are determined by a voltage which is externally set; however, there is no condition that determines the base voltages of the transistors Q23 and Q24, and therefore, an operation of the gyrator 40 or 42 may be unstable.

In order to solve such a problem, the embodiment FIG. 15 can be utilized. With reference to FIG. 15, a semiconductor inductance circuit, that is gyrator 40 or 42 includes differential amplifying circuits 88 and 90, and direct current bias is applied to a base of a transistor Q21 of the differential amplifying circuit 88 from an input terminal 92. The transistor Q21 constitutes a differential pair 89 together with a transistor Q22, and a base of the transistor Q22 is connected to an output terminal 94. A capacitor C is inserted between a collector of the transistor Q2 and a direct current voltage source Vcc to which a collector of the transistor Q21 is connected. In addition, an output of the differential pair 89, that is, the collector of the transistor Q2 is connected to a base of a transistor Q23 of a differential amplifying circuit 90. To a base of a transistor Q24 which constitutes a differential pair 91 together with the transistor Q23, a predetermined and fixed bias voltage VB4 is supplied by a direct current voltage source 112, and therefore, the base of the transistor Q4 is grounded in an alternate current. Then, collectors of the transistors Q23 and Q24 are connected to the input terminal 94 and the output terminal 96, respectively. In addition, in FIG. 15, difference numerals 96-110 denote constant direct current sources, respectively. Furthermore, the capacitor C may be inserted between the collector of the transistor Q22 and the direct current voltage source 112.

In the gyrator 40 or 42 shown in FIG. 15, on the assumption that a differential resistor of each of the transistors Q21 and Q22 is re0, a collector voltage Vc of the transistor Q22 is given by the following equation (8) at a angle frequency ω.

$$Vc = \frac{1}{j\omega C} \cdot V1 \cdot \frac{1}{2re0} \tag{8}$$

In addition, on the assumption that a differential resistor of each of the transistors Q23 and Q24 is re1, since i1=Vc/2 re1, a current i1 is represented by the following equation (9) and thus the following equation (10) is obtainable.

$$i1 = \frac{1}{j\omega C} \cdot V1 \cdot \frac{1}{2re0} \cdot \frac{1}{2re1} \tag{9}$$

$$\frac{V1}{i1} = j\omega(C \cdot 2re0 \cdot 2re1) \tag{10}$$

If $L = C \cdot 2re0 \cdot 2re1$, the following equation (11) is obtained.

$$V1 = j\omega L \, i1 \tag{11}$$

Therefore, an inductance characteristic is obtained between the input terminal 92 and the output terminal 94.

Next, a description concerning the base bias of each of the respective transistors Q21–Q24 will be made. If a direct current bias is applied to the base of the transistor Q21 from the input terminal 92 and the base voltage of the transistor Q21 is larger than the base voltage of the transistor Q22, the collector voltage Vc of the transistor Q22, that is, the base voltage of the transistor Q23 increases. When the base voltage of the transistor Q23 becomes larger than the base voltage of the transistor Q24 (=VB4), the collector voltage of the transistor Q24, that is, the base voltage of the transistor Q22 increases and becomes stable at a voltage equal to the base voltage of the transistor Q21. On the other hand, the base voltage of the transistor Q23 becomes stable at a voltage equal to the base voltage of the transistor Q24. Thus, all the base biases of the respective transistors Q21–Q24 can be determined, and therefore, an operation of shown in the embodiment of FIG. 15 becomes stable.

Figure 16:
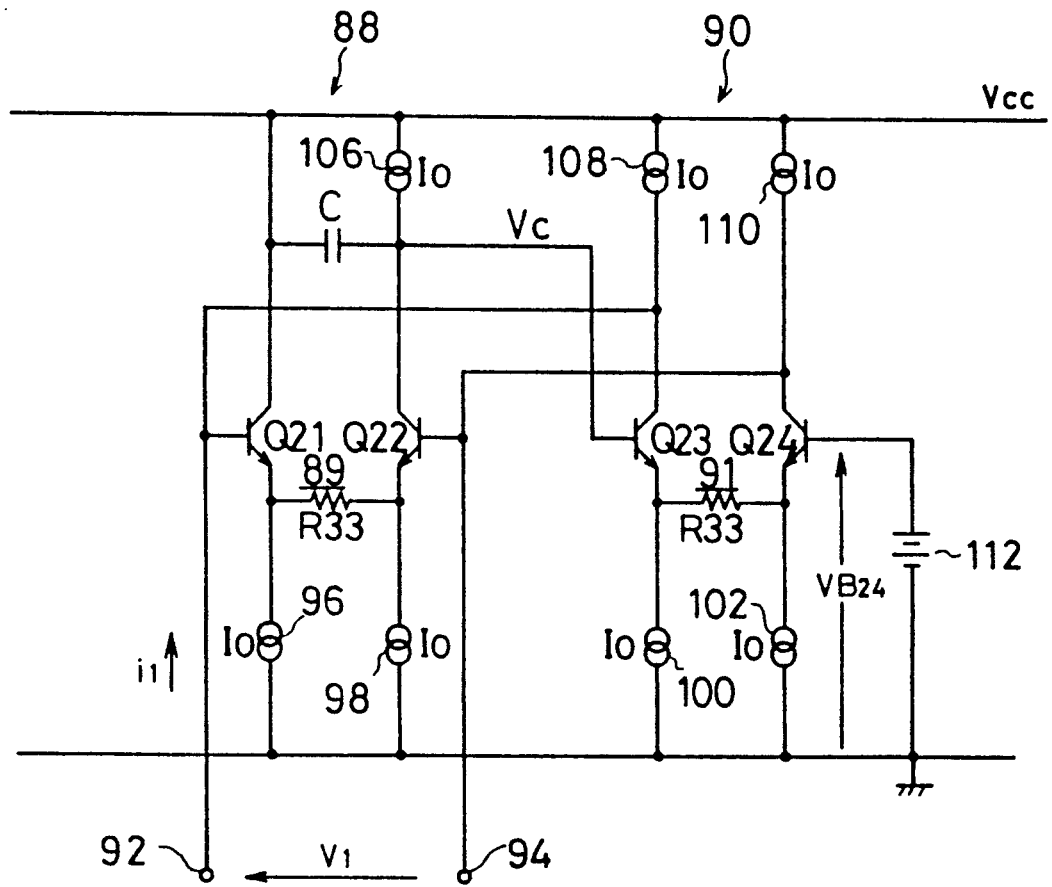

A semiconductor inductance circuit, that is, a gyrator 40 or 42 shown in FIG. 16 is a circuit obtained by modifying the embodiment of FIG. 15. More specifically, in FIG. 16, resistors R33 are inserted between the emitters of the transistors Q21 and Q22 and between the emitters of the transistors Q23 and Q24, respectively so as to make a dynamic range of the circuit larger. In the embodiment of FIG. 16, as in the embodiment of FIG. 15, the collector voltage Vc of the transistor Q23 is given by the following equation (12), and a current i1 is represented by the following equation (13), and thus, the following equation (14) is obtainable.

$$Vc = \frac{1}{j\omega C} \cdot V1 \cdot \frac{1}{2re0 + R33}$$

$$i1 = \frac{1}{j\omega C} \cdot V1 \cdot \frac{1}{2re0 + R33} \cdot \frac{1}{2re1 + R33} \tag{13}$$

$$\frac{V1}{i1} = j\omega C(2re0 + R33)(2re1 + R33) \tag{14}$$

If the assumption of $L = C \cdot (2re0 + R33)(2re1 + R33)$ is obtained, the above described equation (14) becomes the following equation (15), and therefore, an inductance characteristic is obtainable between the input terminal and the output terminal 94.

$$V1 = j\omega L i1 \tag{15}$$

In addition, each bias at the bases of the respective transistors Q21–Q24 in FIG. 16 embodiment can be determined in a manner similar to that of FIG. 15 embodiment.

Figure 17:
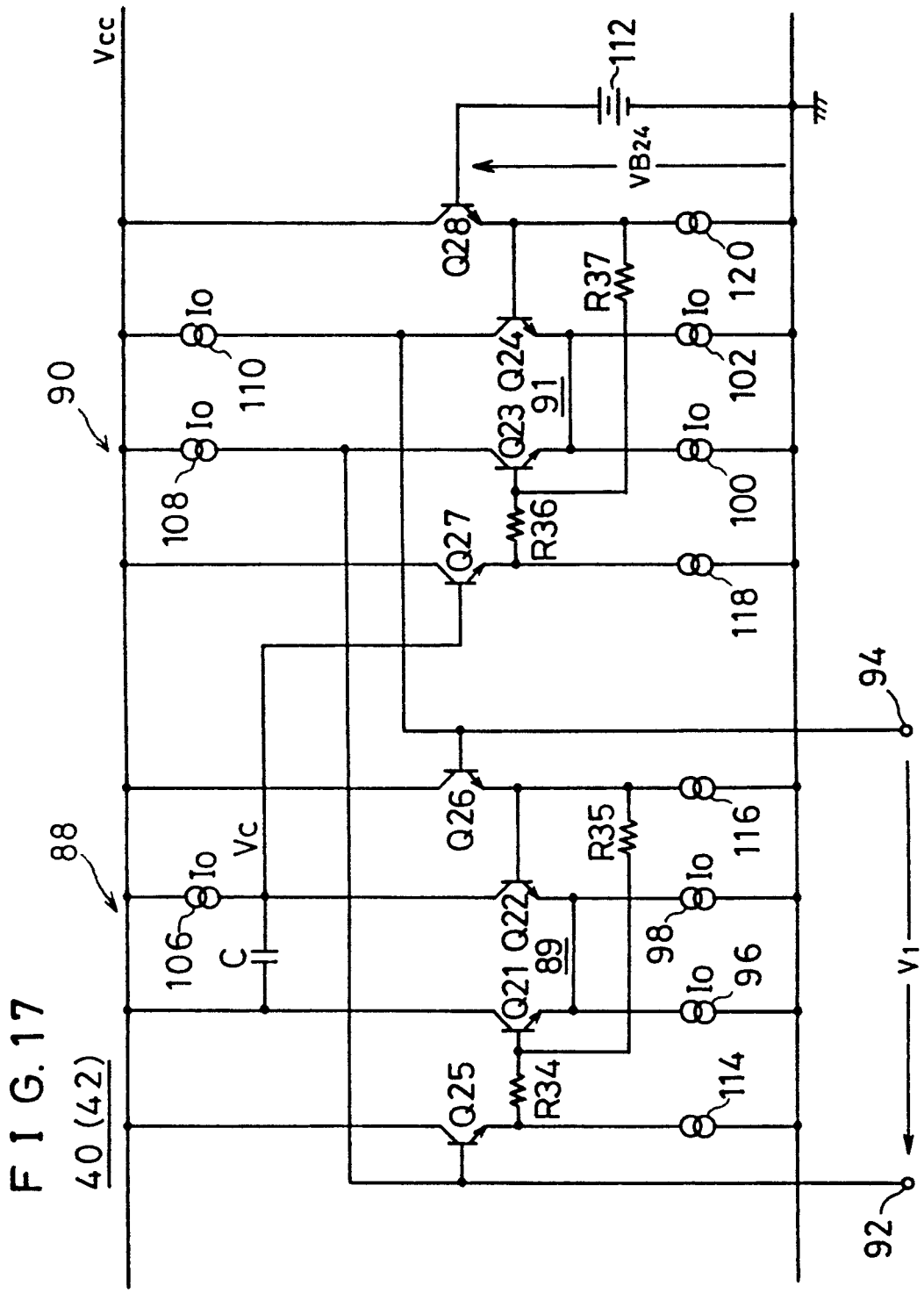

A gyrator 40 or 42 shown in FIG. 17 is a modified embodiment of the embodiment of FIG. 15. More specifically, a voltage-dividing circuit of resistors R34 and R35 and a voltage-dividing circuit of resistors R36 and R37, transistors Q25–Q28, and etc. are added to FIG. 15 embodiment so as to make a dynamic range of the circuit larger. More specifically, a transistor Q25 is inserted between the input terminal 92 and the transistor Q21, and a base of the transistor Q25 is connected to the input terminal 92, a collector of the transistor Q25 is connected to a direct current voltage source Vcc, and an emitter of the transistor Q25 is connected to the base of the transistor Q21 via the resistor R34. In addition, a transistor Q26 is inserted between the output terminal 94 and the transistor Q22. A base of the transistor Q26 is connected to the output terminal 94, a collector of the transistor Q26 is the direct current voltage source Vcc, and an emitter of the transistor Q26 is connected to the base of the transistor Q22. Then, the resistor R35 is inserted between the basis of the transistors Q21 and Q22. As similar to the above, a transistor Q27 is inserted between an output of the differential amplifying circuit 88, that is, the collector of the transistor Q22 and the transistor Q23.

A base of the transistor Q27 is connected to the collector of the transistor Q22, a collector of the transistor Q27 is connected to the direct current voltage source Vcc, and an emitter of the transistor Q27 is connected to the base of the transistor Q23 via the resistor R36. In addition, a transistor Q28 is inserted between the direct current voltage source 112 and the transistor Q4. A base, collector and emitter of the transistor Q28 are connected to the direct current voltage source 112, the direct current voltage source Vcc and the base of the transistor Q24, respectively. The resistor R37 is inserted between the bases of the transistors Q23 and Q24. In addition, reference numerals 114, 116, 118 and 120 denote constant current sources, respectively.

In the embodiment of FIG. 17, on the assumption that a voltage applied between the input terminal 92 and the output terminal 94, that is, between the bases of the transistors Q25 and Q26 is V1, a voltage difference $\Delta V1$ between the bases of the transistors Q21 and Q22 is represented by the following equation (16) because the same is divided by the resistors R34 and R35.

$$\Delta V1 = \frac{R35}{R34 + R35} V1 \tag{16}$$

Therefore, the collector Vc voltage Vc of the transistor Q22 is given by the following equation (17), and the current i1 is represented by the following equation (19) and thus the following equation (20) is obtainable.

$$Vc = \frac{1}{j\omega C} \cdot \frac{R35}{R34 + R35} V1 \cdot \frac{1}{2re0} \tag{17}$$

$$i1 = \frac{Vc}{2re1} = \frac{R35}{j\omega C \cdot (R34 + R35) \cdot 2re0} V1 \cdot \frac{1}{2re1} \tag{18}$$

$$\frac{V1}{i1} = j\omega C \cdot \frac{R34 + R35}{R34} \cdot 2re1 \cdot 2re0 \tag{19}$$

If $L = C \cdot (1 + R35/R34) \cdot 2re1 \cdot 2re0$, the following equation (20) is obtained, and thus, an inductance characteristic is obtained between the input terminal 92 and the output terminal 94.

$$V1 = j\omega L i1 \tag{20}$$

In the embodiment of FIG. 17, base biases of the respective transistors Q21–Q24 are decided in a manner similar to that of the embodiment of FIG. 15.

Figure 18:
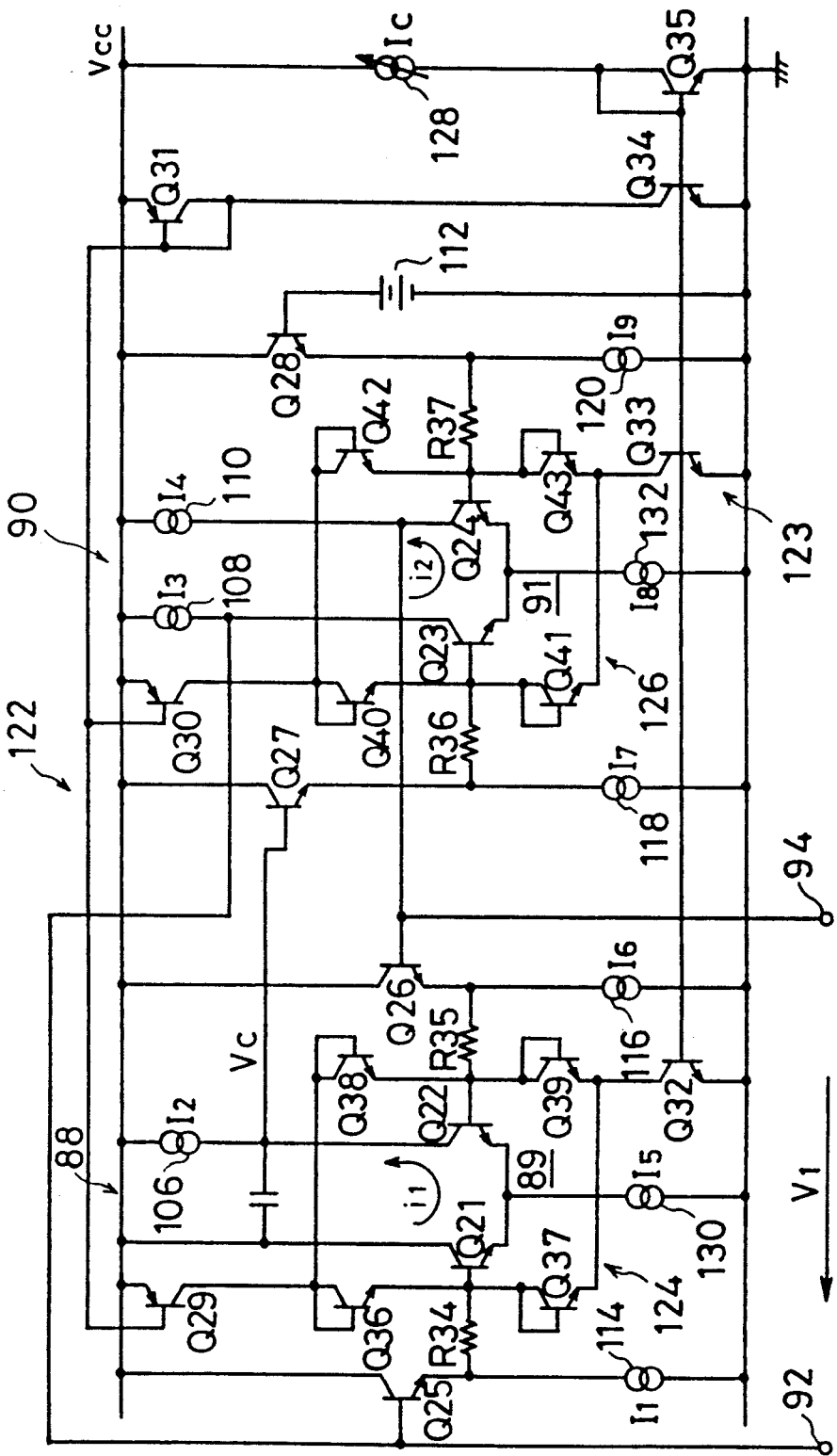

In FIG. 18, a modified embodiment obtained from the embodiment of FIG. 17 is shown. More specifically, in FIG. 18 embodiment, a current mirror circuit 122 including transistors Q29–Q31, a current mirror circuit 123 including transistors Q32–Q35, an attenuator 124 including transistors Q36–Q39, an attenuator 126 including transistors Q40–Q43 and a variable constant current source 128 are further added to the embodiment of FIG. 17. In addition, in the embodiment of FIG. 18, the constant current sources 96 and 98 are eliminated from the embodiment of FIG. 17 and a constant current source 130 is used, and the constant current sources 100 and 102 are eliminated from the embodiment of FIG. 17 and a constant current source 132 is used. Furthermore, the attenuators 124 and 126 may be constructed with only the transistors Q36 and Q37 and the transistors Q41 and Q42, respectively.

A gyrator 40 or 42 shown in FIG. 18 includes constant current sources 114, 106, 108, 110, 130, 116, 118, 132 and 120 respectively having a current I1, I2, I3, I4, I5, I6, I7, I8 and I9. Then, a condition that $I5 = I8 = -2I2 = 2I3 = 2I4 = IB$ and a condition that $R34 = R35 = R36 = R37 = RB$ are set. In addition, on the assumption that a current flowing the variable constant current source 128 is Ic, the current mirror circuits 122 and 123 are set so that approximately the same current Ic is supplied with the current mirror circuits 122 and 123.

Under the circumstances, on the assumption that a voltage between the input terminal 92 and the output terminal 94, that is, between the bases of the transistors Q25 and Q26 is V1, a voltage difference $\Delta$ V1 between the bases of the transistors Q21 and Q22 can be represented by the following equation (21) because it is divided by the resistors R38 and R39 and resistance components re of each of the transistors Q36 and Q39.

$$\Delta V1 = \frac{re}{2RB + re} V1 \quad (21)$$

The resistance component re may be represented by the following equation (22).

$$re = \frac{2kT}{qI_c} \quad (22)$$

wherein k is Boltzmann's constant, T is an absolute temperature and q is a charge of an electron.

Therefore, a current i1 flows in the differential pair 88 including the transistors Q21 and Q22 due to the voltage difference $\Delta$ V1, and therefore, the output voltage Vc of the base of the transistor Q27 can be represented by the following equation (23).

$$Vc = \frac{1}{j\omega C} \cdot i1 = \frac{1}{j\omega C} \cdot \frac{\Delta V1}{2re'} \quad (23)$$
$$= \frac{1}{j\omega C} \cdot \frac{re}{(2RB + re)} \cdot \frac{V1}{2re'}$$

where re' is an emitter differential resistor of each of the transistors Q21 and Q22 and represented by the following equation (24).

$$re' = \frac{2kT}{qI_B} \quad (24)$$

Then, a voltage difference $\Delta$ Vc applied between the bases of the transistors Q23 and Q24 of the differential pair 91 due to the output voltage Vc is obtained by the following equation (25) as similar to that of the differential pair 89.

$$\Delta Vc = \frac{re}{2RB + re} Vc \quad (25)$$

Therefore, in the differential pair 91, a current i2 represented by the following equation (26) flows due to the voltage difference $\Delta$ Vc.

$$i2 = \frac{\Delta Vc}{2re'} = \frac{re}{2re'(2RB + re)} \cdot Vc \quad (26)$$
$$= \frac{re}{2re'(2RB + re)} \cdot \frac{1}{j\omega C} \cdot \frac{re}{(2RB + re)} \cdot \frac{V1}{2re'}$$
$$= \frac{re^2}{(2re')^2(2RB + re)^2 \cdot j\omega C} \cdot V1$$

Therefore, an impedance between the bases of the transistors Q25 and Q26 becomes as the following equation (27).

$$\frac{V1}{i2} = \frac{(2re')^2(2RB + re)^2 \cdot j\omega C}{re^2} \quad (27)$$

If $L = C \cdot (2RB + re)^2 \cdot (2re')^2/re^2$, the voltage V1 is given by the following equation (28).

$$V1 = j\omega L \, i1 \quad (28)$$

If $2RB \gg re$, the inductance L can be represented by the following equation (29), which can be controlled by a control current Ic.

$$L \approx \frac{C \cdot 2RB \cdot (2re')^2}{re^2} \quad (29)$$
$$= \frac{C \cdot 2RB \cdot (2 \cdot 2kT/qI_B)^2}{(2kT/qI_C)^2}$$
$$= 8CRB \cdot \left(\frac{I_C}{I_B}\right)^2$$

In addition, the base bias of each of the transistors Q21–Q24 can be decided in a manner similar to that of FIG. 15 embodiment.

Figure 19:
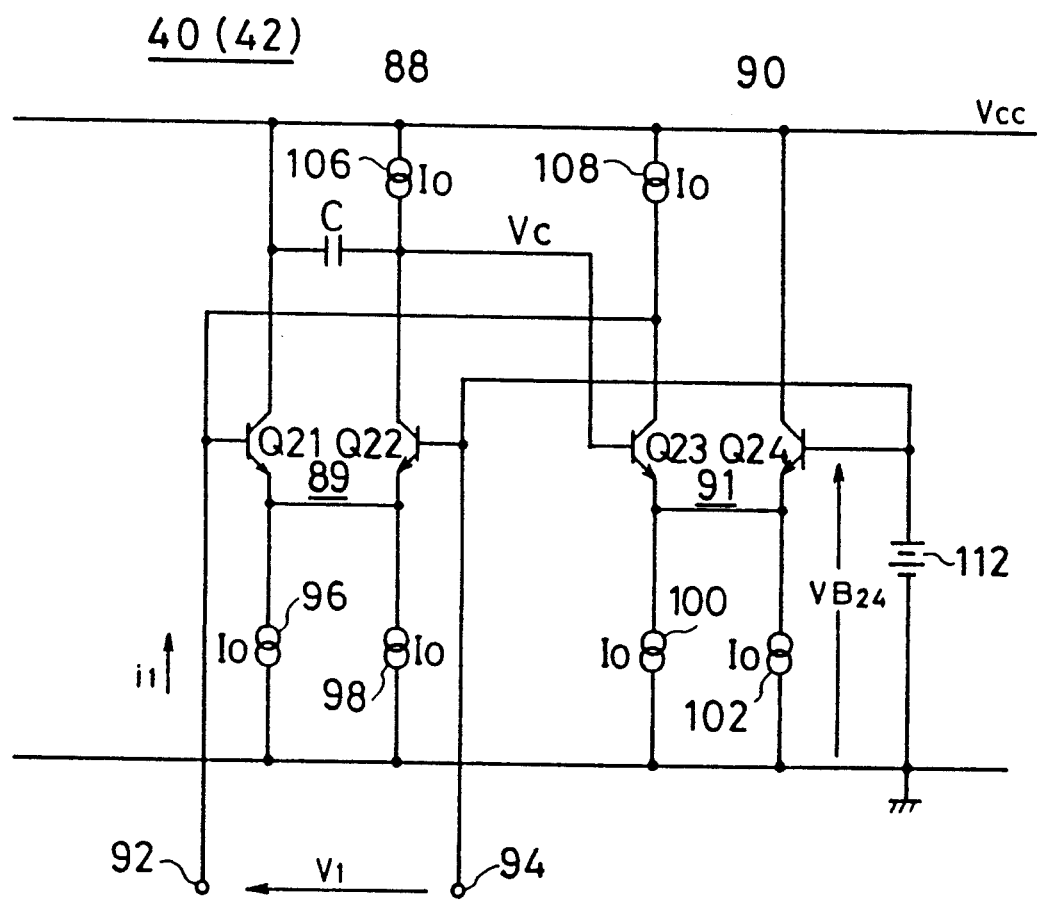

Furthermore, the semiconductor inductance circuit 40 or 42 shown in FIG. 18 is equivalently a circuit in which one end is grounded in alternative current as shown in FIG. 19. That is, in the semiconductor inductance circuit 40 or 42 shown in FIG. 19, in comparison with the embodiment of FIG. 15, a direct current voltage source 112 is connected to a base of the transistor Q22, and the constant current source 110 is omitted. However, a value of the inductance L obtained by the embodiment of FIG. 19 becomes the same value as that of the embodiment of FIG. 15.

In FIG. 19, if the base voltage of the transistor Q21 becomes larger than the base voltage of the transistor Q22, the collector voltage Vc of the transistor Q22, that is, the base voltage of the transistor Q23 increases. When the base voltage of the transistor Q23 becomes higher than the base voltage of the transistor Q24, the current i1 increases. Therefore, a voltage drop occurs due to an impedance (not shown) at the base end of the transistor Q21, and resultingly, the base voltage of the transistor Q23 becomes equal to the base voltage (=VB4) of the transistor Q24. Thus, base biases of respective transistors Q21–Q24 can be determined in the above described manner.

Furthermore, in the aforementioned embodiment shown in FIGS. 9 and 11, there is a problem that it is necessary to make characteristics of the level detectors 64 and 66 coincident with each other because if the characteristics are not coincident with each other, a separation degree of the Y/C separation circuit 10 is deteriorated. In order to avoid such a problem, the embodiment of FIG. 20 can be used.

Figure 20:
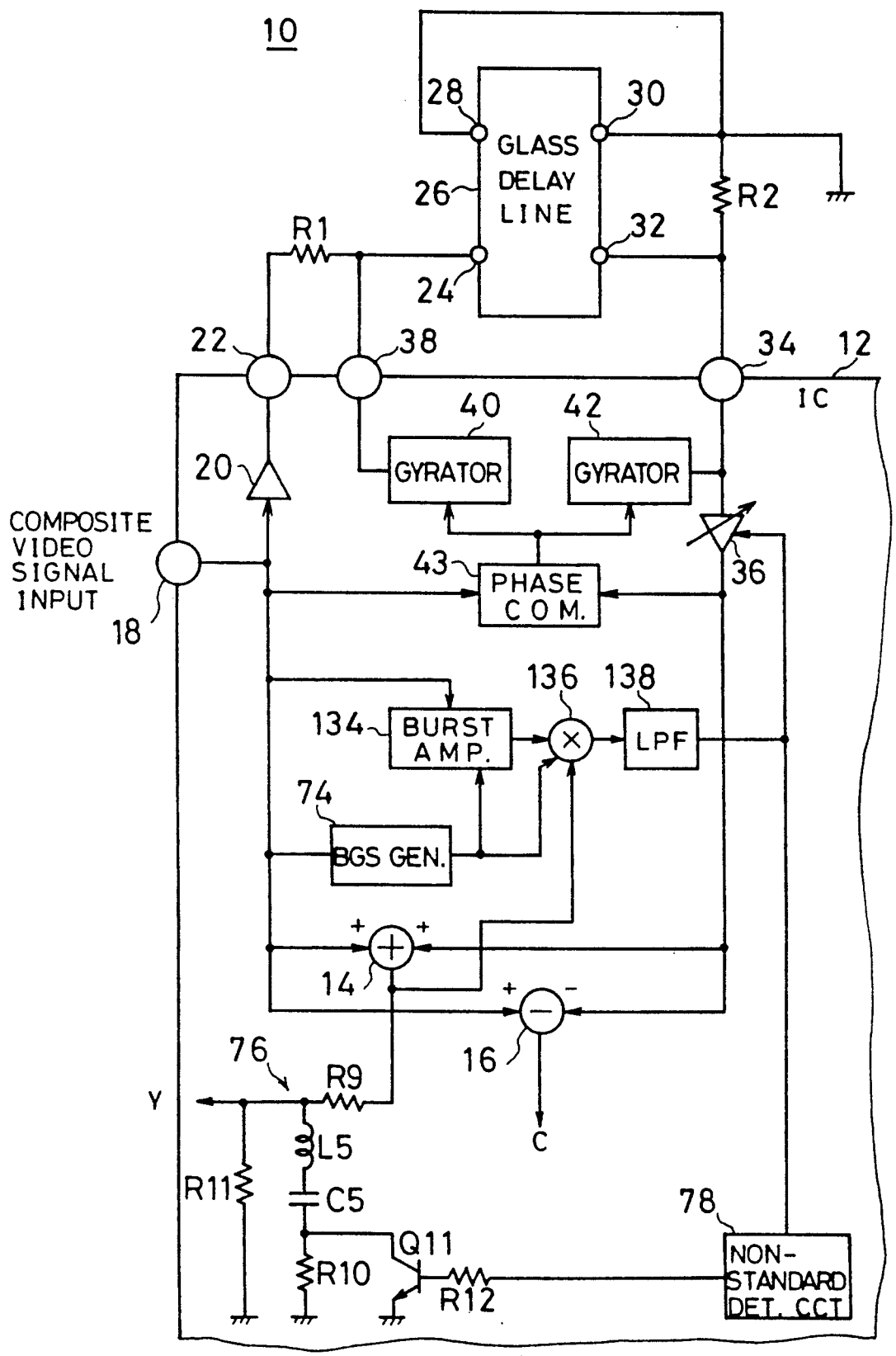
FIG. 20 is a circuit diagram showing another embodiment according to the present invention.

In FIG. 20, the input composite video signal (burst signal) is inputted to a burst amplifier 134 which is controlled by the output of the burst gate signal (BGS) generator 74 as similar to a multiplier 136. To the multiplier 136, an output of the burst amplifier 134 and the output of the adding circuit 14 are applied, and an output of the multiplier 136 is applied to the variable amplifier 36 as a control voltage therefor.

Figure 22:
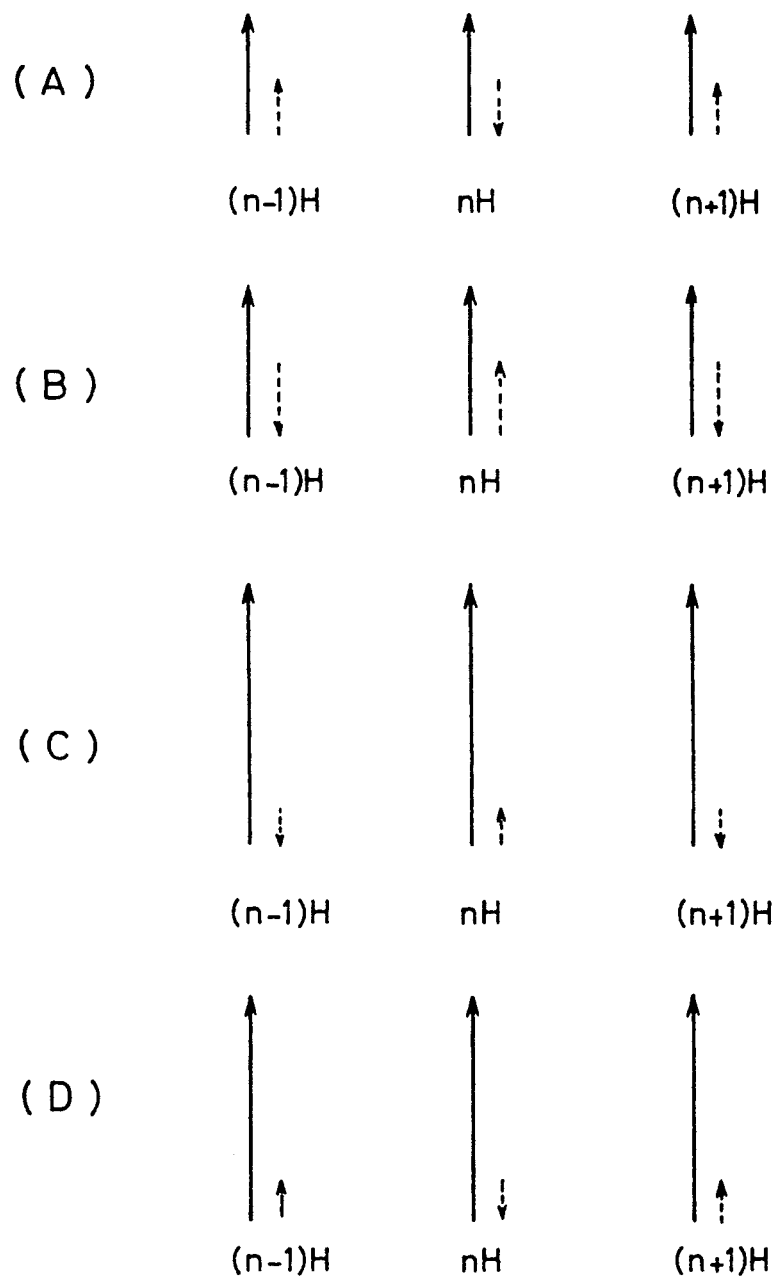
FIG. 22(A)–FIG. 22(D) are graphs showing an operation of FIG. 20 embodiment.
Figure 3:
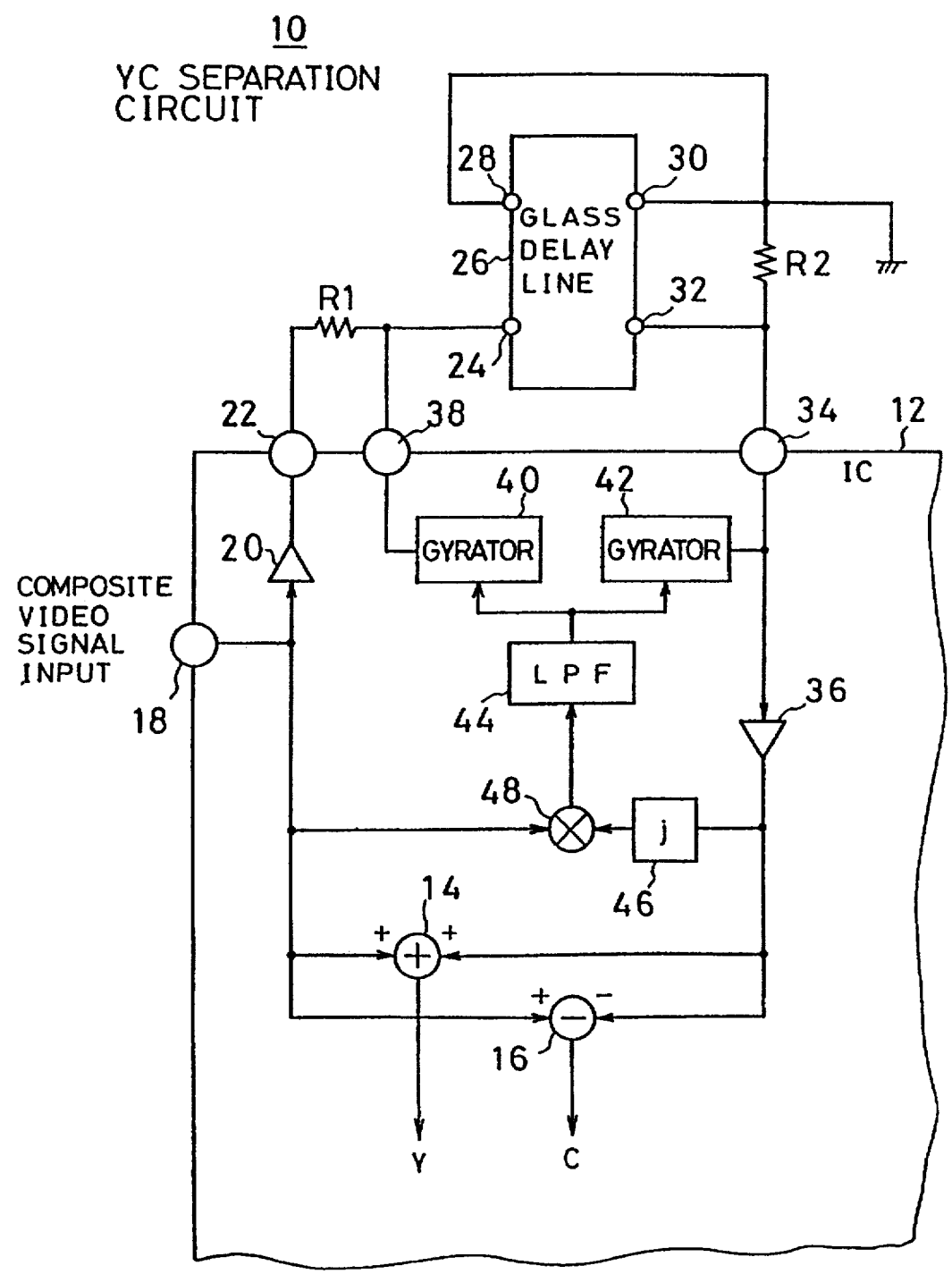

An operation of this embodiment shown in FIG. 20 will be described with reference to FIG. 22(A)–FIG. 22(D). FIG. 22(A) schematically shows an amplitude and a phase of a luminance signal and a chrominance signal included in the input composite video signal for every 1H, and a solid line represents the luminance signal and a dotted line represents the chrominance signal. As shown in FIG. 22(A), the phase of the luminance signal is constant, but the phase of the chrominance signal is inverted every 2H.

A luminance signal and a chrominance signal at the output of the variable amplifier 36 are shown in Fig. 22(B). Now, assuming that the chrominance signal included in the output from the variable amplifier 36 is larger than the chrominance signal included in the input composite video signal, the output of the adding circuit 14 becomes as shown in FIG. 22(C), and therefore, the chrominance signal remains in the luminance signal. The burst amplifier 134 and the multiplier 136 are activated in only the burst period by the burst gate signal generator 74, and therefore, in the multiplier 136, a burst signal included in the output of the adding circuit 14 and a burst signal included in the input composite video signal are multiplied with each other. That is, in the multiplier 136, the chrominance signal shown in Fig. 22(A) and the chrominance signal shown in FIG. 22(C) are multiplied with each other, and therefore, in the output of the multiplier 136, a signal having an amplitude and a polarity corresponding to an amplitude and a polarity of the burst signal included in the output from the adding circuit 14 is obtained.

Therefore, by integrating the signal by the lowpass filter 138 so as to control a gain of the variable amplifier 36, the chrominance signal component included in the output of the variable amplifier 36 becomes smaller.

In contrast, the chrominance signal included in the output of the variable amplifier 36 is smaller than the chrominance signal included in the input composite video signal, the output of the adding circuit 14 becomes as shown in FIG. 22(D). Therefore, in this case, the multiplier 136 outputs a signal having an amplitude corresponding to an amplitude of the burst signal included in the output of the adding circuit 14 and a polarity opposite to a polarity of the burst signal. In this case, a gain of the variable amplifier 36 is controlled by the output of the low-pass filter 138 in a direction opposite to that of the above described case, that is, in a direction that the gain is increased, and therefore, the chrominance signal component included in the output of the variable amplifier 36 becomes larger.

Since the embodiment of FIG. 20 operates in the above described manner, finally, this circuit becomes stable at a position that an amplitude of the chrominance signal included in the input composite video signal becomes coincident with an amplitude of the chrominance signal included in the output of the variable amplifier 36. Therefore, a separation degree cannot be deteriorated.

In addition, FIG. 21 shows a modified embodiment obtained from the embodiment of FIG. 20. In the embodiment of FIG. 21, an input to the burst amplifier 134 is applied from the output of the variable amplifier 36, but remaining portions and an operation are the same as that of the embodiment of FIG. 20, and therefore, a detailed description will be omitted here.

Furthermore, as the multiplier 136 the embodiment shown in FIG. 20 or 21, the same circuit configuration as that of FIG. 5 embodiment can be utilized. In this case, one of the burst signals may be applied to the terminals 54 and 56 and the other of the burst signals may be applied to the terminals 58 and 60.

Furthermore, in the above described embodiments a Y/C separation circuit is described, the present invention may be applied to a chroma canceller for canceling a chrominance component in a reproduced luminance signal in the VTR, a cross talk canceller for canceling a cross talk component in a reproduced chrominance signal, and etc.

Although the present invention has been described and illustrated in detail, it is clearly understood that the same is by way of illustration and example only and is not to be taken by way of limitation, the spirit and scope of the present invention being limited only by the terms of the appended claims.

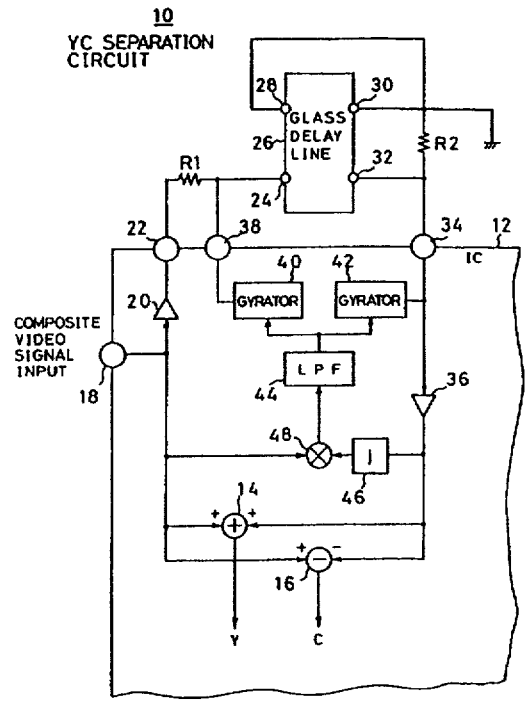

What is claimed is:

1. A Y/C separation circuit, comprising:
   an input terminal for receiving a composite video signal;
   a glass delay line having a delay time of one horizontal line for receiving a composite video signal inputted from the input terminal;
   an addition circuit for obtaining a luminance signal on the basis of the composite video signal and an output signal from the glass delay line;
   a subtracting circuit for obtaining a chrominance signal on the basis of the composite video signal and the output signal from the glass delay line;
   a semiconductor variable inductance circuit serving as a terminating load for at least one of an input and an output of the glass delay line; and
   first control means for controlling an inductance value of the semiconductor variable inductance circuit by outputting a control voltage to the semiconductor variable inductance circuit, said control voltage being a function of the input composite video signal and the output signal from the glass delay line.

2. A Y/C separation circuit according to claim 1, wherein said semiconductor variable inductance circuit includes a first differential amplifying circuit having a first input for receiving an input signal, a second input connected to an output terminal; and a second differential amplifying circuit having a third input, a fourth input, a first output and a second output.

3. A Y/C separation circuit according to claim 2, wherein said semiconductor variable inductance circuit further includes a capacitor connected between outputs of said first differential amplifying circuit.

4. A Y/C separation circuit according to claim 2, wherein said third input is connected to an output of said first differential amplifying circuit, and said semiconductor variable inductance circuit further includes a direct current voltage source grounded in alternative current and connected to said fourth input of said second differential amplifying circuit; a capacitor connected between said output of said first differential amplifying circuit and a level of said alternative current ground; a first feed-back path for connecting said first output of said second differential amplifying circuit; and second feed-back path for connecting any one of said second output of said second differential amplifying circuit and said direct current voltage source to said second input of said first differential amplifying circuit.

5. A Y/C separation circuit according to claim 1, wherein first said control means includes a first phase comparing means for comparing phases of the input composite video signal and an output signal outputted from said glass delay line to output a signal according to a phase difference between said two signals; and first control signal applying means for applying a first control signal to said semiconductor variable inductance circuit in response to said signal outputted from said first phase comparing means.

6. A Y/C separation circuit according to claim 5, wherein said first phase comparing includes first multiplying means for multiplying a color burst signal included in said composite video signal by a color burst signal included in said output signal outputted from said glass delay line.

7. A Y/C separation circuit according to claim 5, further comparing phase shifting means for shifting a phase of said output signal outputted from said glass delay line, wherein said first phase comparing means compares phases of said composite video signal and a phase-shifted signal outputted from said phase shifting means.

8. A Y/C separation circuit according to claim 7, said first phase comparing means includes first multiplying means for multiplying a color burst signal included in said composite video signal by a color burst signal included in said phase-shifted signal outputted from said phase shifting means.

9. A Y/C separation circuit according to claim 7, wherein said phase shifting means includes 90° phase shifting means for shifting a phase of said output signal from said glass delay line by 90°.

10. A Y/C separation circuit according to claim 9, wherein said 90° phase shifting means includes a negative feed-back amplifier having a negative feed-back loop; a low-pass filter inserted in said negative feed-back loop, said low-pass filter including a resistor and a capacitor; and means for outputting a 90° phase-shifted signal by utilizing a difference signal between an input signal of said negative feed-back amplifier or a signal equivalent thereto and an output signal of said negative feed-back amplifier.

11. A Y/C separation circuit according to claim 5, further comprising variable gain amplifying means for varying a level of a signal to be applied to said first phase comparing means; and second control means for controlling said gain of said variable gain amplifying means.

12. A Y/C separation circuit according to claim 11, wherein said second control means includes means for applying a second control signal in response to said luminance signal outputted from said adding means.

13. A Y/C separation circuit according to claim 12, wherein said second control means includes means for applying a second control signal in response to an amplitude and a polarity of a color burst signal included in said luminance signal outputted from said adding means.

14. A Y/C separation circuit according to claim 12, wherein said second control means includes a second phase comparing means for comparing phases of the input composite video signal and said luminance signal outputted from said adding means to output a signal according to a phase difference between said two signals; and second control signal applying means for applying a second control signal to said variable gain amplifying means in response to said signal outputted from said second phase comparing means.

15. A Y/C separation circuit according to claim 14, said second phase comparing means includes second multiplying means for multiplying a color burst signal included in said composite video signal by a color burst signal included in said luminance signal outputted from said adding means.

16. A Y/C separation circuit according to claim 12, wherein said second control means includes a second phase comparing means for comparing phases of an output from said variable gain amplifying means and said luminance signal outputted from said adding means to output a signal according to a phase difference between said two signals; and second control signal applying means for applying a second control signal to said variable gain amplifying means in response to said signal outputted from said second phase comparing means.

17. A Y/C separation circuit according to claim 16, said second phase comparing means includes second multiplying means for multiplying a color burst signal included in said output from said variable gain amplifying means by a color burst signal included in said luminance signal outputted from said adding means.

18. A Y/C separation circuit according to claim 11, wherein said second control means outputs said second control signal on the basis of said composite video signal from said input terminal and said output signal from the glass delay line.

19. A Y/C separation circuit according to claim 18, wherein said second control means includes level comparing means for comparing a level of said composite video signal with a level of an output signal from said variable gain amplifying means to output a second control signal.

20. A Y/C separation circuit according claim 19, wherein said level comparing means includes a first level detector detecting the level of said composite video signal; a second level detector detecting the level of the output signal from said variable gain amplifying means; and an error amplifier for receiving outputs of said first level detector and said second level detector to output an error signal according to a level difference.

21. A Y/C separation circuit according to claim 1, further comprising attenuating means connected to an output of said adding means for attenuating a chrominance signal component in said luminance signal.

22. A Y/C separation circuit according to claim 21, wherein said attenuating means is adapted to change an attenuation rate, further comprising changing means for changing said attenuation rate in response to an output from said first control means.

23. A Y/C separation circuit according to claim 22, wherein said attenuating means is adapted to change an attenuation rate, further comprising changing means for changing said attenuation rate in response to an output from any one of said first control means and said second control means.

24. A Y/C separation circuit according to claim 21, further comprising variable gain amplifying means for varying a level of a signal to be applied to said first phase comparing means; and second control means for controlling said gain of said variable gain amplifying means.

25. A Y/C separation circuit according to claim 23, wherein said second control means includes level comparing means for comparing a level of said composite video signal with a level of an output signal from said variable gain amplifying means to output a second control signal, and said changing means includes means for applying a changing signal to said attenuating means in response to an output from said second control means.

26. A comb filter, comprising:
an input terminal for receiving a composite video signal;
a glass delay line having a delay time of one horizontal line for receiving a composite video signal inputted from the input terminal;
an adding circuit for obtaining a luminance signal on the basis of the composite video signal and an output signal from the glass delay line;
a subtracting circuit for obtaining a chrominance signal on the basis of the composite video signal and the output signal from the glass delay line;
a semiconductor variable inductance circuit serving as a terminating load for at least one of an input and an output of the glass delay line; and
first control means for controlling an inductance value of the semiconductor variable inductance circuit by outputting a control voltage to the semiconductor variable inductance circuit, said control voltage being a function of the input composite video signal and the output signal from the glass delay line.

27. A comb filter, comprising:
delaying means for delaying a synthesized signal of a first signal including a color burst signal and a chrominance signal, and a second signal having a frequency-interleave relationship between the first signal by one horizontal line;
variable amplifying means for amplifying an output of said delaying means with a gain;
adding means for adding said synthesized signal and an output from said variable amplifying means; and
gain controlling means connected to an output of said adding means for outputting a control signal having an amplitude and a polarity responsive to an amplitude and a polarity of said synthesized signal to control the gain of said variable amplifying means.

28. A television receiver which comprises a comb filter, said comb filter comprising:
an input terminal for receiving a composite video signal;
a glass delay line having a delay time on one horizontal line for receiving a composite video signal inputted from the input terminal;
an adding circuit for obtaining a luminance signal on the basis of the composite video signal and an output signal from the glass delay line;
a subtracting circuit for obtaining a chrominance signal on the basis of the composite video signal and the output signal from the glass delay line;
a semiconductor variable inductance circuit serving as a terminating load for at least one of an input and an output of the glass delay line; and
first control means for controlling an inductance value of the semiconductor variable inductance circuit by outputting a control voltage to the semiconductor variable inductance circuit, said control voltage being a function of the input composite video signal and the output signal from the glass delay line.

29. A television signal processing apparatus which comprises a comb filter, said comb filter comprising:
an input terminal for receiving a composite video signal;
a glass delay line having a delay time of one horizontal line for receiving a composite video signal inputted from the input terminal;
an adding circuit for obtaining a luminance signal on the basis of the composite video signal and an output signal from the glass delay line;
a subtracting circuit for obtaining a chrominance signal on the basis of the composite video signal and the output signal from the glass delay line;
a semiconductor variable inductance circuit serving as a terminating load for at least one of an input and an output of the glass delay line; and
first control means for controlling an inductance value of the semiconductor variable inductance circuit on the basis of the input composite video signal and the output signal from the glass delay line.

* * * * *

UNITED STATES PATENT AND TRADEMARK OFFICE
CERTIFICATE OF CORRECTION

PATENT NO.  : 5,267,027
DATED       : November 30, 1993
INVENTOR(S) : Hidehiro Ugaki, et al It is certified that error appears in the above-identified patent and that said Letters Patent is hereby corrected as shown below:

Title page:
Showing an illustrative figure, should be deleted and substitute therefore the attached title page.

In the drawings, Sheet 3 consisting of Fig. 3, should be deleted and substitute therefore the corrected drawing sheet consisting of Fig. 3, as shown on the attached page.

Signed and Sealed this

Seventh Day of August, 2001

Attest:

NICHOLAS P. GODICI
Attesting Officer   Acting Director of the United States Patent and Trademark Office

United States Patent [19]

Ugaki et al.

[11] Patent Number: 5,267,027
[45] Date of Patent: Nov. 30, 1993

[54] COMB FILTER-TYPE Y/C SEPARATOR CIRCUIT

[75] Inventors: Hidehiro Ugaki, Souraku; Kazunori Nohara, Osaka; Nobukazu Hosoya, Nara, all of Japan

[73] Assignee: Sanyo Electric Co., Ltd., Moriguchi, Japan

[21] Appl. No.: 875,793

[22] Filed: Apr. 28, 1992

[30] Foreign Application Priority Data

Apr. 30, 1991 [JP] Japan .................................. 3-098891
Jun. 13, 1991 [JP] Japan .................................. 3-141967
Jun. 28, 1991 [JP] Japan .................................. 3-158984
Jul. 31, 1991 [JP] Japan .................................. 3-192133

[51] Int. Cl.$^5$ .................................................. H04N 9/64
[52] U.S. Cl. .................................................. 358/31; 358/40; 333/215
[58] Field of Search .................. 358/31, 39, 40, 149; 333/215; 307/490, 494

[56] References Cited

U.S. PATENT DOCUMENTS 4,766,486  8/1988  Ozaki ................................ 358/31
4,809,060  2/1989  Saeki ................................ 358/31
4,969,033  11/1990  Yamada et al. ................... 358/40
5,025,311  6/1991  Hosoi ............................... 358/31

Primary Examiner—James J. Groody
Assistant Examiner—John W. Miller
Attorney, Agent, or Firm—Armstrong, Westerman, Hattori, McLeland & Naughton

[57] ABSTRACT

A Y/C separation circuit includes a glass delay line for delaying an input composite video signal. A luminance signal and a chrominance signal are separated from each other by an adding circuit and a subtracting circuit each of which receives the input signal and an output signal from the glass delay line. The output signal from the glass delay line is phase-shifted by a 90° phase shifting circuit and then inputted to a multiplier which further receives the input signal. The multiplier outputs an error signal according to a phase difference between color burst signals included in the both signals, and a control voltage according to the error signal is outputted from a low-pass filter. The control voltage is applied to gyrators which terminate an input and an output of the glass delay line, respectively, whereby an inductance value of each of the gyrators is controlled by the control voltage such that a delay time of the glass delay line can be exactly adjusted at one horizontal period.

29 Claims, 22 Drawing Sheets